US010025154B2

(12) United States Patent
Gleason et al.

(10) Patent No.: US 10,025,154 B2
(45) Date of Patent: Jul. 17, 2018

(54) CAMERA LENS FILTER

(71) Applicant: Apple Inc., Cupertino, CA (US)

(72) Inventors: Jeffrey N. Gleason, San Francisco, CA (US); Xingchao C. Yuan, Palo Alto, CA (US); Ryan J. Dunn, San Francisco, CA (US); Linsen Bie, Fremont, CA (US); Xi Guo, Mountain View, CA (US); Miodrag Scepanovic, San Jose, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 14/794,654

(22) Filed: Jul. 8, 2015

(65) Prior Publication Data

US 2016/0091768 A1    Mar. 31, 2016

Related U.S. Application Data

(60) Provisional application No. 62/055,227, filed on Sep. 25, 2014.

(51) Int. Cl.
*G02F 1/153* (2006.01)
*G02F 1/163* (2006.01)
(Continued)

(52) U.S. Cl.
CPC ............ *G02F 1/163* (2013.01); *G02B 5/005* (2013.01); *G02B 27/58* (2013.01); *G02F 1/155* (2013.01);
(Continued)

(58) Field of Classification Search
CPC ......... G02B 27/58; G02B 5/005; G02F 1/155; G02F 1/163; G02F 2001/1552; G03B 11/00; G03B 7/02; G03B 9/02
(Continued)

(56) References Cited

U.S. PATENT DOCUMENTS 6,317,248 B1 * 11/2001 Agrawal ................. G02F 1/155
340/438
6,667,471 B2   12/2003 Bos et al.
(Continued)

FOREIGN PATENT DOCUMENTS

DE          199 07 334 A1    8/2000

OTHER PUBLICATIONS

T. Deutschmann et al., "Integrated Electrochromic Iris Device for Low Power and Space-Limited Application", http://iopscience.iop.org/2040-8986/16/7/075301/pdf/2040-8986_16_7075301, Jun. 18, 2014, IOP Publishing Ltd, University of Kaiserslautern, DE.
(Continued)

*Primary Examiner* — Joseph P Martinez
*Assistant Examiner* — Vipin Patel
(74) *Attorney, Agent, or Firm* — Womble Bond Dickinson (US) LLP

(57) ABSTRACT

An electrically activated lens filter with an electro-optic portion having a radially and circumferentially symmetric electric field gradient is disclosed. More particularly, embodiments of the lens filter include an electro-optic portion having one or more conductive plugs arranged around a center region such that an electric field within the electro-optic portion varies from a maximum at an outer rim to a minimum outside of the center region. The lens filter may include a plurality of front electrodes and rear electrodes accessible in an axial direction for electrically activating front and rear transparent conductive layers, respectively.

20 Claims, 14 Drawing Sheets

(51) Int. Cl.
  *G02F 1/155* (2006.01)
  *G02B 5/00* (2006.01)
  *G03B 9/02* (2006.01)
  *G02B 27/58* (2006.01)
  *G03B 7/02* (2006.01)
  *G03B 11/00* (2006.01)

(52) U.S. Cl.
  CPC .............. *G03B 7/02* (2013.01); *G03B 9/02* (2013.01); *G02F 2001/1552* (2013.01); *G03B 11/00* (2013.01)

(58) Field of Classification Search
  USPC .............................. 359/271, 266, 269, 275
  See application file for complete search history.

(56) References Cited

U.S. PATENT DOCUMENTS

| | | |
|---|---|---|
| 6,906,842 B2 | 6/2005 | Agrawal et al. |
| 6,963,437 B2 | 11/2005 | Bauer et al. |
| 8,228,587 B2* | 7/2012 | Burdis .................. G02F 1/1523 216/24 |
| 2008/0049295 A1 | 2/2008 | Tonar et al. |
| 2011/0176195 A1* | 7/2011 | Veenman .................. G02F 1/15 359/273 |
| 2014/0192257 A1 | 7/2014 | Gleason et al. |

OTHER PUBLICATIONS

International Preliminary on Patentability Chapter 1 for PCT International Appln No. PCT/US2015/047769 dated Mar. 28, 2017. (8 pages).

PCT International Search Report and Written Opinion for PCT International Appln No. PCT/US2015/047769 dated Nov. 11, 2015. (11 pages).

* cited by examiner

CAMERA LENS FILTER

This application claims the benefit of U.S. Provisional Patent Application No. 62/055,227, filed Sep. 25, 2014, and this application hereby incorporates herein by reference that provisional patent application.

BACKGROUND

Field

Embodiments related to an electrically activated lens filter with an electro-optic portion having an electric field gradient with radial and circumferential symmetry are disclosed. More particularly, an embodiment related to a lens filter that may be integrated in a camera module to provide an aperture stop, is disclosed.

Background Information

Camera modules have been incorporated in a variety of consumer electronics devices, including mobile devices such as smart phones, mobile audio players, personal digital assistants, and other portable and desktop computers. A typical camera module includes an optical system used to collect and transmit light from an imaged scene to an imaging sensor. The optical system generally includes at least one lens associated with one aperture stop. The lens collects and transmits light. The aperture stop limits the light collected and includes an aperture through which light is transmitted. The aperture is therefore termed the stop aperture, or alternatively, the camera pupil. The effective diameter of the stop aperture combined with the lens focal length determines the "F number" of the lens. A lens with a lower F number produces a brighter image than a lens with a larger F number and, as a result, reduces the image noise in a low light scene. However, as the F number is reduced, the lens depth of field decreases and, as a result, lens aberrations increase. Thus, there is an optimal aperture size, dependent on the lens and the scene being imaged, to minimize image noise and maximize image resolution.

In most portable consumer electronics devices, minimizing device profile is an important design goal. Accordingly, device profile limitations generally prohibit the use of an iris diaphragm as a variable aperture stop. Another way to control the amount of light admitted through the lens to balance image brightness and resolution is to use an electro-optic aperture. Such devices may be sized to fit within the space constraints of portable consumer electronics devices. An electro-optic aperture may include an electro-chromic (EC) medium that attenuates light that is passing through the aperture, in response to a voltage being applied to a pair of transparent conductive layers that sandwich the EC medium. One of the transparent conductive layers may be patterned to include a void in a central portion, so as to form a ring-like aperture stop with an inner aperture area that remains transparent when the EC medium is energized and an outer stop that becomes dark, thereby yielding in effect a smaller pupil size. With this approach, the patterned transparent conductive layer creates a radially uniform electric field in the EC medium, and thus, uniform opacity across the outer stop area of the ring-like aperture stop. Since voltage may be applied at a single location around a circumference of each transparent conductive layer, the electric field may vary substantially in a circumferential direction, with a maximum field located at a point of contact and a minimum field located opposite from the point of contact. This electric field, which may be radially uniform (no-gradient from an outer edge to a center location) and circumferentially non-symmetric (no symmetry and/or uniformity of an electric field about a central axis) may generate opacity with a "top hat" light transmission profile, such that light transmission drops off sharply between the aperture and the stop regions, and varies in a circumferential direction.

SUMMARY

Lens filters having an electro-optic portion with an electric field gradient that is radially and circumferentially symmetric, particularly for use in portable consumer electronics device applications, are disclosed. In an embodiment, a lens filter includes a front transparent conductive layer, a rear transparent conductive layer having a center region with a circular perimeter, and an electrochromic layer between the front transparent conductive layer and the rear transparent conductive layer. One or more conductive plugs may be arranged along the perimeter, and each conductive plug may extend across the electrochromic layer from the front transparent conductive layer to the rear transparent conductive layer. For example, the electrochromic layer may include a continuous trench along the entire perimeter that is filled by a conductive filler to form a conductive plug. Accordingly, each conductive plug may directly connect the front transparent conductive layer with the rear transparent conductive layer in an axial direction across the electrochromic layer. The conductive plugs may have substantially zero electrical resistivity to create an electrical short around the perimeter. Accordingly, when an electrical potential difference is applied between several front electrodes and rear electrodes that are arranged along an outer rim of the lens filter, a radially symmetric electric field gradient may be generated in the electrochromic layer that varies from a maximum electrical potential difference at the outer rim to zero electrical potential difference at the perimeter. Since the area within the perimeter does not support an electric field, the center region within the perimeter may remain transparent during electrical activation. The conductive plugs may be formed in various manners, including as continuous or discontinuous plugs, e.g., as a set of electrical vias arranged along the perimeter. Furthermore, the conductive plugs may be formed from various materials, e.g., the front conductive layer and the one or more conductive plugs may be contiguously formed.

In an embodiment, a lens filter includes a front transparent conductive layer having several front electrodes arranged along an outer rim and separated from one another by several circumferential gaps. The lens filter may include a rear transparent conductive layer having several rear electrodes arranged along an outer rim, and exposed in an axial direction through circumferential gaps in the front transparent conductive layer. The front transparent conductive layer and the rear transparent conductive layer may be separated by an electrochromic layer, and one or more conductive plugs may directly connect the front transparent conductive layer and the rear transparent conductive layer across the electrochromic layer. More particularly, the conductive plugs may be arranged around a center region of the rear transparent conductive layer. In an embodiment, the front electrodes and the rear electrodes are distributed evenly along the outer rims and/or are arranged circumferentially about a same diameter such that electrical activation of the electrodes generates a circumferentially symmetric electric field within the electrochromic layer. For example, there may be at least four front electrodes and as many rear electrodes distributed evenly around the lens filter rim.

In other embodiments, a portable consumer electronics device including one or more of the lens filters described above may include, in addition to the lens filter(s), a device housing and a camera module integrated in the device housing. The camera module may include an imaging sensor configured to receive light from a scene through the lens filter. Furthermore, the portable consumer electronics device may include a driver circuit configured to apply an electrical potential difference between the front electrodes and the rear electrodes of the lens filter to generate a radially and circumferentially symmetric electric field gradient with a correspondingly symmetric light transmittance profile.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
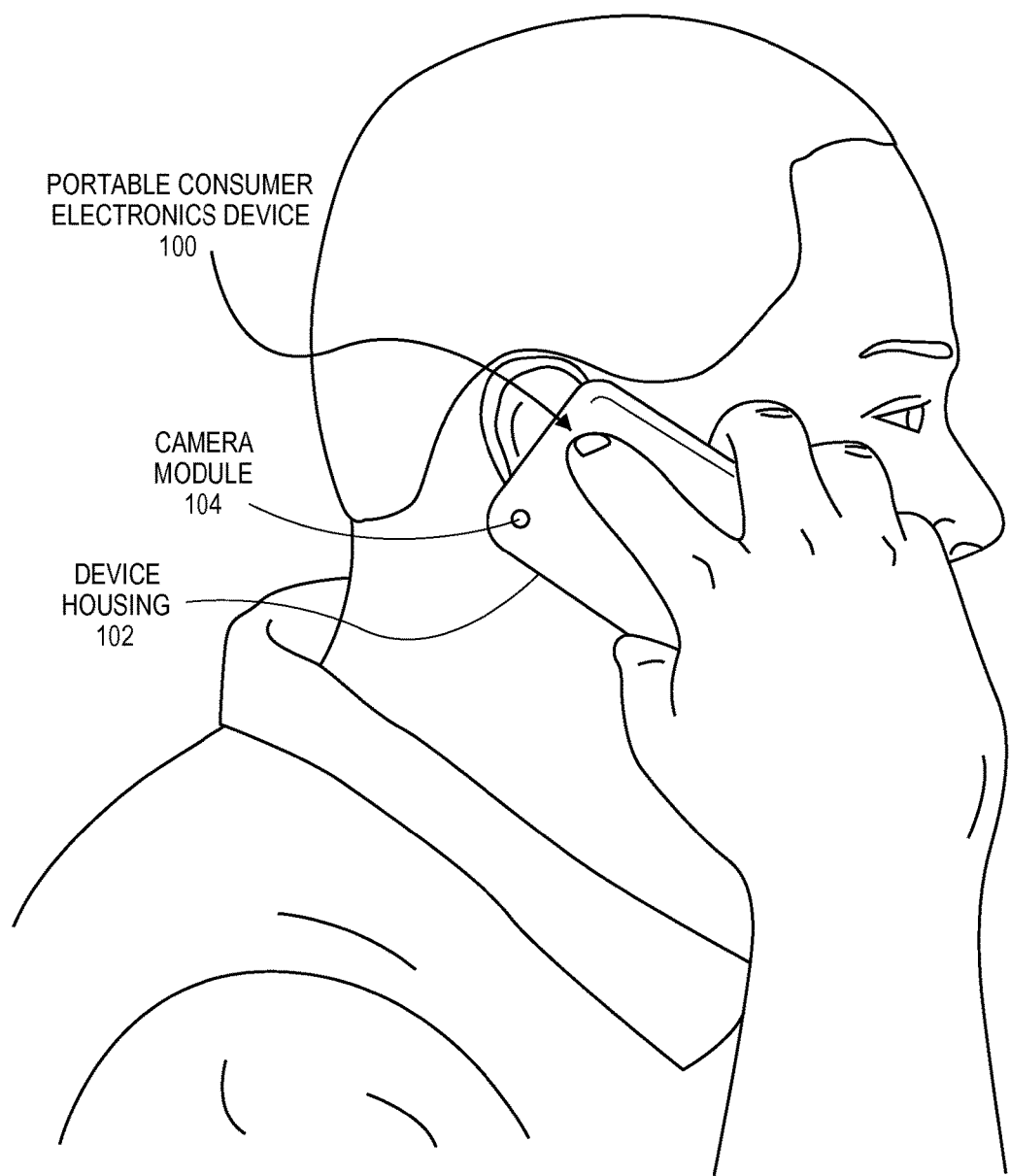
FIG. 1 is a pictorial view of a portable consumer electronics device being used in accordance with an embodiment.

Embodiments describe lens filters having an electro-optic portion with a radially and circumferentially symmetric electric field gradient, particularly for use in portable consumer electronics device applications. However, while some embodiments are described with specific regard to integration within mobile electronics device, the embodiments are not so limited and certain embodiments may also be applicable to other uses. For example, a lens filter as described below may be incorporated into a camera module that remains at a fixed location, e.g., a traffic camera, or used in a relatively stationary application, e.g., in a desktop computer, or a motor vehicle.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment", or the like, means that a particular feature, structure, configuration, or characteristic described is included in at least one embodiment. Thus, the appearance of the phrase "one embodiment," "an embodiment", or the like, in various places throughout this specification are not necessarily referring to the same embodiment. Furthermore, the particular features, structures, configurations, or characteristics may be combined in any suitable manner in one or more embodiments.

The use of relative terms throughout the description, such as "front" and "rear" may denote a relative position or direction. For example, a "front face" may be directed in a first axial direction and a "rear face" may be directed in a second direction opposite to the first axial direction. However, such terms are not intended to limit the use of a lens filter to a specific configuration described in the various embodiments below. For example, a front face of a lens filter may be directed in any direction with respect to an external environment, including toward an external device housing or toward an imaging sensor within the device housing. Similarly, the terms "front" and "rear" are not intended to be limiting of a direction along which light may pass through a lens filter, since in various embodiments, light may pass through an aperture of a lens filter in either a rearward direction, e.g., through a front face, or in a frontward direction, e.g., through a rear face.

In an aspect, a lens filter includes an electro-optic portion with a radially symmetric electric field gradient such that filter opacity, which varies with electric field, gradually decreases from an outer rim of the lens filter to an aperture region on either side of a central optical axis. The aperture region may include one or more conductive plugs that directly connects a front transparent conductive layer with a rear transparent conductive layer such that an electrical short is created. Furthermore, the electrical short may be continuous and surround a central region of a predetermined diameter to form the stop aperture. As a result, the area within the central region has no electrical potential difference and remains transparent, while the area outside of the continuous short path exhibits opacity that increases from the conductive plug toward an outer rim of the lens filter. Thus, the lens filter transmits light in a manner that transitions smoothly from a maximum to a minimum intensity in a radially symmetric manner.

In an aspect, a lens filter includes a plurality of segmented electrodes (or electrode segments) arranged along an outer rim of a front conductive layer and a rear conductive layer of a lens filter to apply voltage to an electro-optic portion and generate a circumferentially symmetric electric field gradient. The electrodes (or electrode segments) of a respective conductive layer may be distributed evenly around the respective outer rim of the conductive layer, and electrodes of one conductive layer may not overlap with electrodes of another conductive layer. Thus, application of a voltage to these electrodes creates an electric field that is regularly arranged and distributed around a central optical axis. Furthermore, in an embodiment, all of the electrodes (on both of the conductive layers) may be exposed in an axial direction to allow all electrodes to be accessed from the same side of the lens filter.

Referring to FIG. 1, a pictorial view of a portable consumer electronics device is shown being used in accordance with an embodiment. In this example, the portable consumer electronics device 100 is a smart phone having a device housing 102 with a front face that is up against an ear of the user during a phone call. A rear face of the device housing 102 may have an opening through which a camera module 104 is visible. Camera module 104 may enable photographic functionality for the smart phone. In other embodiments, camera module 104 may be integrated within other portable and non-portable consumer electronics devices, e.g., tablet computers, laptop or notebook computers, and/or other devices that can benefit from a low-profile lens filter having an electrically variable aperture.

Figure 2:
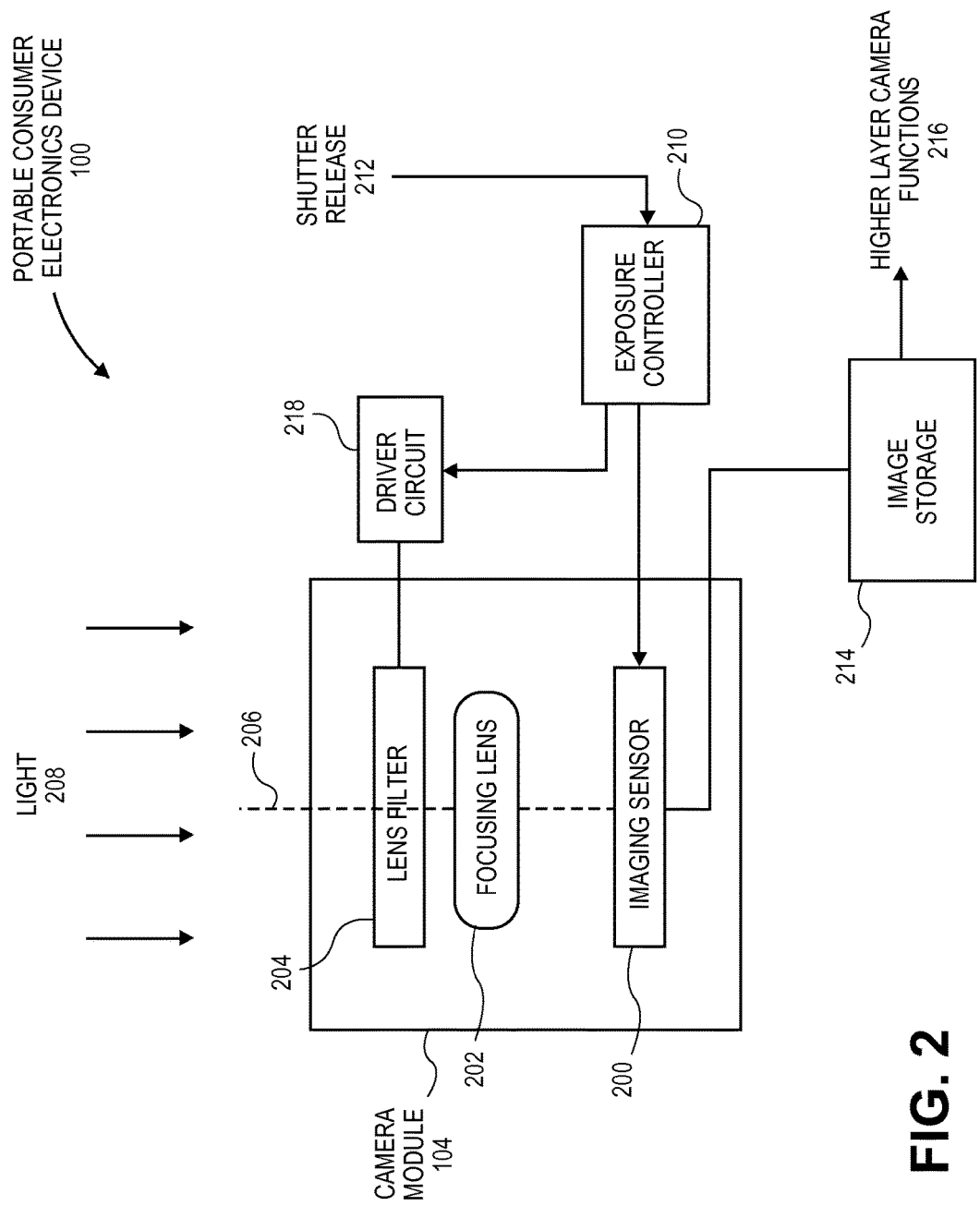
FIG. 2 is a block diagram of camera-related elements and associated electronics circuitry in a portable consumer electronics device in accordance with an embodiment.

Referring to FIG. 2, a block diagram of camera-related elements and associated electronics circuitry in a portable consumer electronics device is shown in accordance with an embodiment. Additional functionality may be implemented in portable consumer electronics device 100, e.g., communication network interfaces, display screens, touch screens, keyboards, and audio transducers; for conciseness, however, such functionality is not described further here. In an embodiment, camera module 104 includes an optical system having an imaging sensor 200, a focusing lens 202, and a lens filter 204. These optical elements may be aligned along an optical axis 206. In an embodiment, a mirror or other optical deflector allows one or more of the optical elements to be positioned off of a straight line. Nevertheless, the optical elements may still be considered "aligned along the optical axis" given that light 208 would propagate along optical axis 206 from a scene being imaged through lens filter 204 and focusing lens 202 to imaging sensor 200.

Imaging sensor 200 may be any conventional solid-state imaging sensor such as a complementary metal oxide semiconductor (CMOS) sensor chip, which presents an interface to an exposure controller 210 to receive certain parameters for determining an exposure for taking a picture. The sensor parameters may include pixel integration time, which may be set by exposure controller 210 in accordance with any suitable exposure control algorithm that considers various input variables, e.g., levels of scene illumination and the availability of a flash or strobe illumination. Exposure controller 210 may automatically perform the algorithm to determine an appropriate exposure setting for signal imaging sensor 200 to update its parameters in response to a manual shutter release 212 command, e.g., in response to a mechanical or virtual shutter button being actuated by a user of the device 100. Exposure controller 210 may be implemented as a programmed processor or as a completely hardwired logic state machine together with stored parameter options. Once a digital image has been captured by imaging sensor 200 under the chosen exposure setting, it may be transferred to an image storage 214, e.g., a solid state volatile or a non-volatile memory, prior to being further processed or analyzed by higher layer camera functions 216 that yield for example a still picture file, e.g., in a JPEG format, or a video file, e.g., in a digital movie format.

Focusing lens 202 may include one or more lens elements that serve to collect and focus light 208 from the scene onto imaging sensor 200, thereby producing an optical image on an active pixel array portion of imaging sensor 200. Focusing lens 202 may include either a fixed focus optical subsystem, or a variable focus subsystem that implements an autofocus mechanism. There may also be an optical zoom mechanism as part of focusing lens 202. In the case of an optical zoom lens and/or an auto focus mechanism, additional control parameters relating to lens position can be set by exposure controller 210 for each exposure to be taken.

In FIG. 2, lens filter 204 is shown as being positioned in front of focusing lens 202. However, lens filter 204 may be positioned at any suitable location along optical axis 206 in front of imaging sensor 200, including between focusing lens 202 and imaging sensor 200. As described below, lens filter 204 includes an electro-active aperture that effectively implements a camera pupil with an electrically variable size, e.g., an aperture diameter. When lens filter 204 is electrically controlled to provide a small or narrow pupil, highly collimated rays are admitted to imaging sensor 200, resulting in a sharp focus of a captured image. On the other hand, when the lens filter 204 is electrically controlled to provide a large or wide pupil, un-collimated rays are admitted to imaging sensor 200, resulting in a captured image that is sharp around an object placed in focus by focusing lens 202, but blurry in other image areas. Thus, lens filter 204 may determine how collimated the admitted rays of light 208 from the imaged scene are, and thus, may affect a bokeh of the captured image. Furthermore, lens filter 204 may determine the amount of incident light 208 admitted to imaging sensor 200, and thus, may affect a brightness of the captured image.

In an embodiment, control of the effective pupil size of lens filter 204 is achieved using an electronic driver circuit 218, which may receive a control signal or command from exposure controller 210 representing the desired size of the effective pupil. Driver circuit 218 may translate this input command into a drive voltage that is applied to lens filter 204 to generate an internal electric field gradient, and a corresponding light transmittance profile for lens filter 204, as described below.

Figure 3:
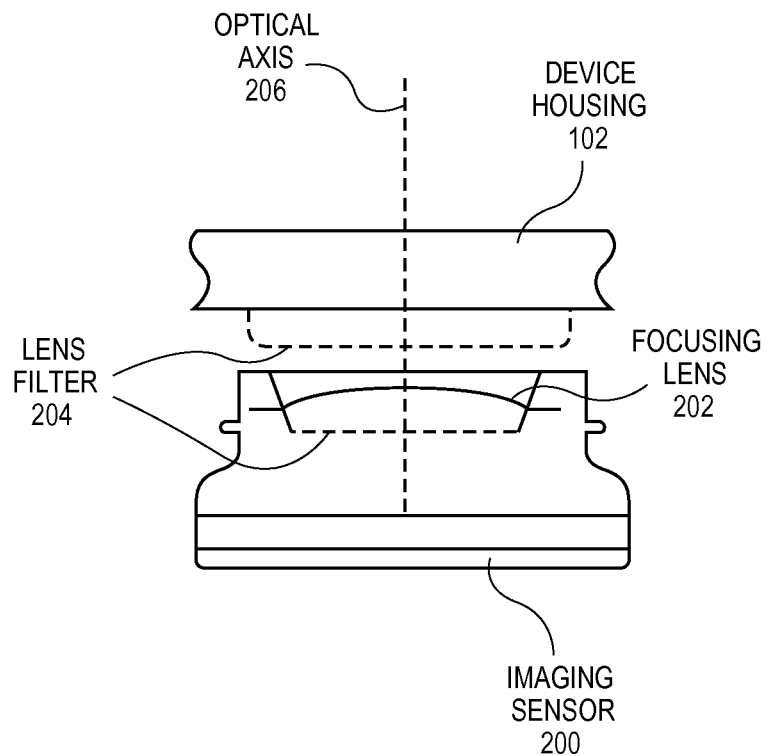
FIG. 3 is a cutaway view of a lens filter of a camera module integrated in a device housing of a portable consumer electronics device in accordance with an embodiment.

Referring to FIG. 3, a cutaway view of a lens filter of a camera module integrated in a device housing of a portable consumer electronics device is shown in accordance with an embodiment. As described above, lens filter 204 may be located in any appropriate position along optical axis 206, including in front of, or behind, focusing lens 202. For example, lens filter 204 may be attached to a rear wall of device housing 102. The rear wall may be formed from glass, polycarbonate, or another suitable material that transmits light 208 from a scene being imaged through the opening in the rear face of device housing 102. In an embodiment, camera module 104 may incorporate multiple lens filters 204, including one lens filter 204 in front of focusing lens 202 and one lens filter 204 behind focusing lens 202. The lenses and lens filters of camera module 104 may be supported and maintained in alignment by a supporting barrel or frame of camera module 104. Thus, the optical elements of camera module 104 may be arranged in any manner appropriate to meet the optical requirements and space limitations of portable consumer electronics device 100.

Figure 4:
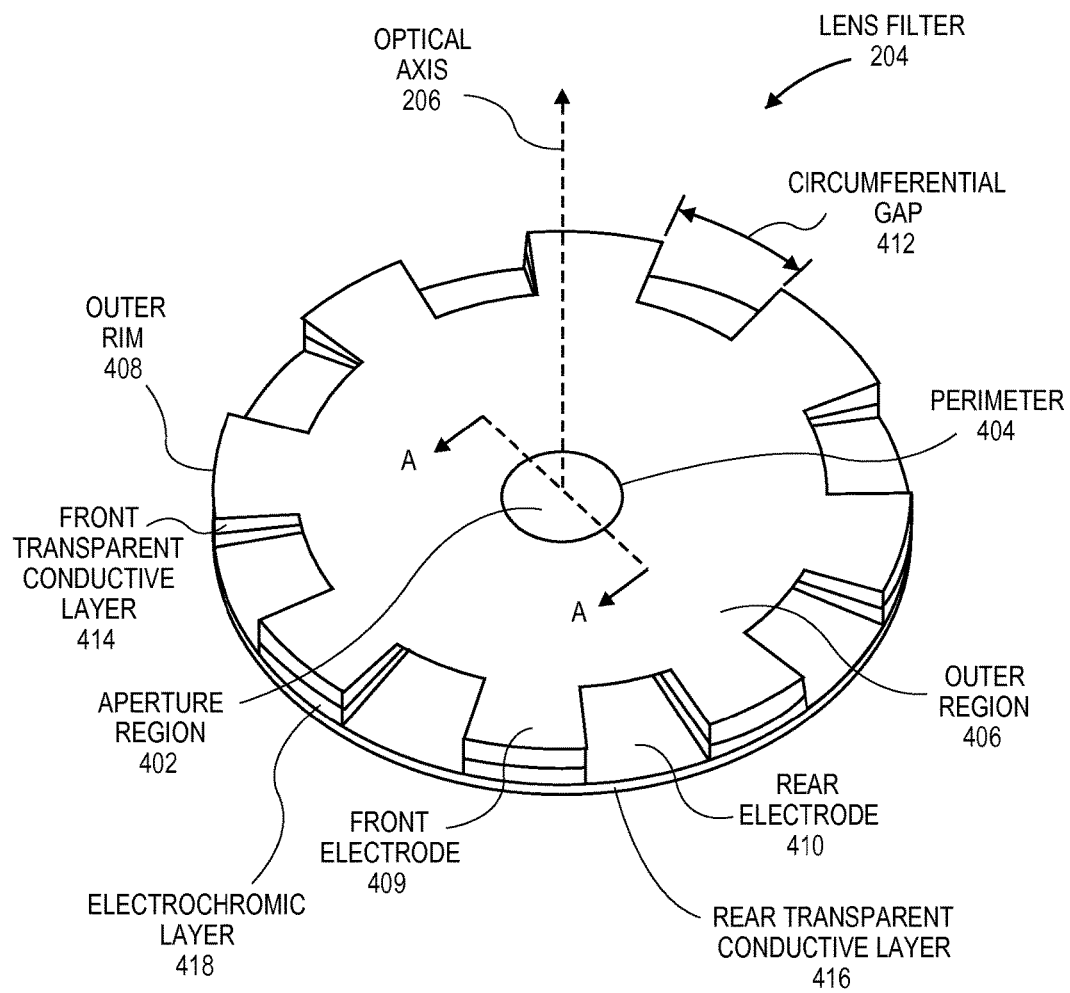
FIG. 4 is a perspective view of a lens filter having an electric field gradient with radial and circumferential symmetry in accordance with an embodiment.

Referring to FIG. 4, a perspective view of a lens filter having an electric field gradient with radial and circumferential symmetry is shown in accordance with an embodiment. Lens filter 204 may include a disk-like structure distributed symmetrically about optical axis 206. For example, lens filter 204 may be generally circular with an aperture region 402 centered on a central optical axis 206. Aperture region 402 may include a perimeter 404 delineating a boundary between an aperture area within perimeter 404 and an outer region 406, e.g., a stop area, outside of perimeter 404. Thus, outer region 406 may extend radially from perimeter 404 to an outer rim 408 of lens filter 204. Outer rim 408 may be a region encompassing a sidewall of lens filter 204, and more particularly, outer rim 408 may include an edge of at least one of several layers in a stack making up lens filter 204. For example, outer rim 408 may include an outer edge of one or more of a transparent conductive layer or an electrochromic layer of lens filter 204, which are described in more detail below.

Along outer rim 408, several electrodes (or electrode segments) may be distributed, e.g., in a circumferentially symmetric manner, each of which provides an electrical contact through which driver circuit 218 may apply a control signal, e.g., a voltage, between a front transparent conductive layer 414 and a rear transparent conductive layer 416 of lens filter 204. The transparent conductive layers may be separated electrically, e.g., by an electrochromic layer 418, between outer rim 408 and perimeter 404. Thus, in an embodiment, several front electrodes 409 (e.g., formed as portions or segments of the front layer 414) and several rear electrodes 410 (e.g., formed as portions or segments of the rear layer 416) may be arranged circumferentially along outer rim 408 and separated from each other by electrochromic layer 418 having non-zero electrical resistance. In an embodiment, front electrodes 409 may be positive electrodes electrically connected with front transparent conductive layer 414 and rear electrodes 410 may be negative electrodes electrically connected with rear transparent conductive layer 416, although such polarities may be reversed in other embodiments.

A circumferentially symmetric distribution of electrodes may include distributing the electrodes (or electrode segments) evenly along outer rim 408 so that, in an embodiment, an angle between radial lines extending from optical axis 206 through adjacent electrodes is the same for all adjacent electrodes. For example, in a case in which four electrodes are evenly distributed along outer rim 408, the angle between each adjacent electrode will be 90 degrees (360 degrees divided by 4). Accordingly, although the electric field may vary in strength between the adjacent electrodes, e.g., being a maximum near each electrode and a minimum half way between the adjacent electrodes, the variation in field strength may be approximately the same between each pair of adjacent electrodes along outer rim 408. Thus, the electrical field may be considered to be symmetric in a circumferential direction since the electric field variation has a repeating pattern between each pair of adjacent electrodes.

In an embodiment, at least two front electrodes 409 may be separated by one or more circumferential gaps 412. The circumferential gaps 412 may extend axially through front transparent conductive layer 414 and through the electrochromic layer 418, exposing a front surface of rear transparent conductive layer 416. Furthermore, a rear electrode 410 may be disposed on this front surface (e.g., the rear electrode 410 may be formed as a portion or segment of the rear conductive layer 416). Thus, the front and rear electrodes 409, 410 may be visible from a front side of lens filter 204 and therefore accessible from the front side in an axial direction of optical axis 206 by electrical leads or pins (in order to deliver the control signal or voltage $V_{control}$). Accordingly, such electrical connectors may be used to apply a voltage $V_{control}$ between the front and rear transparent conductive layers 414, 416.

The front and rear electrodes 410 may be distributed evenly around outer rim 408 such that application of voltage to each electrode results in a circumferentially symmetric electric field about optical axis 206 of lens filter 204. In particular, as more front and rear electrodes 410 are electrically activated, the electric field distribution will become more uniform and/or evenly distributed about optical axis 206 of lens filter 204 within a given radial boundary. For example, radially inward of circumferential gaps 412, the electric field may be symmetric and uniform. In an embodiment, there is no circumferential variation in electric field within a diameter of, e.g., about two-thirds of lens filter 204 diameter. That is, the electric field may be substantially the same at any point within a radius from optical axis 206 equal to two-thirds of a distance from optical axis 206 to outer rim 408. Thus, the optical transmittance profile of lens filter 204 may be circumferentially symmetric and/or uniform over a majority of lens filter 204 front surface area. Accordingly, while there may be as few as two front electrodes 409 separated by two circumferential gaps 412 that expose two rear electrodes 410, it is contemplated that there may be at least four front electrodes 409 and four rear electrodes 410 to improve circumferential electric field distribution. In an embodiment, as shown in FIG. 4, there may be approximately eight front electrodes 409 evenly spaced around outer rim 408 and separated by eight circumferential gaps 412 exposing eight rear electrodes 410 in an axial direction. In other embodiments, there may be even more, e.g., 10-20 front electrodes 409, circumferential gaps 412, and rear electrodes 410. More particularly, any number of electrodes may be chosen to balance the benefit of circumferentially symmetric and/or uniform electric field distribution with the cost of manufacturing lens filter 204.

Figure 5:
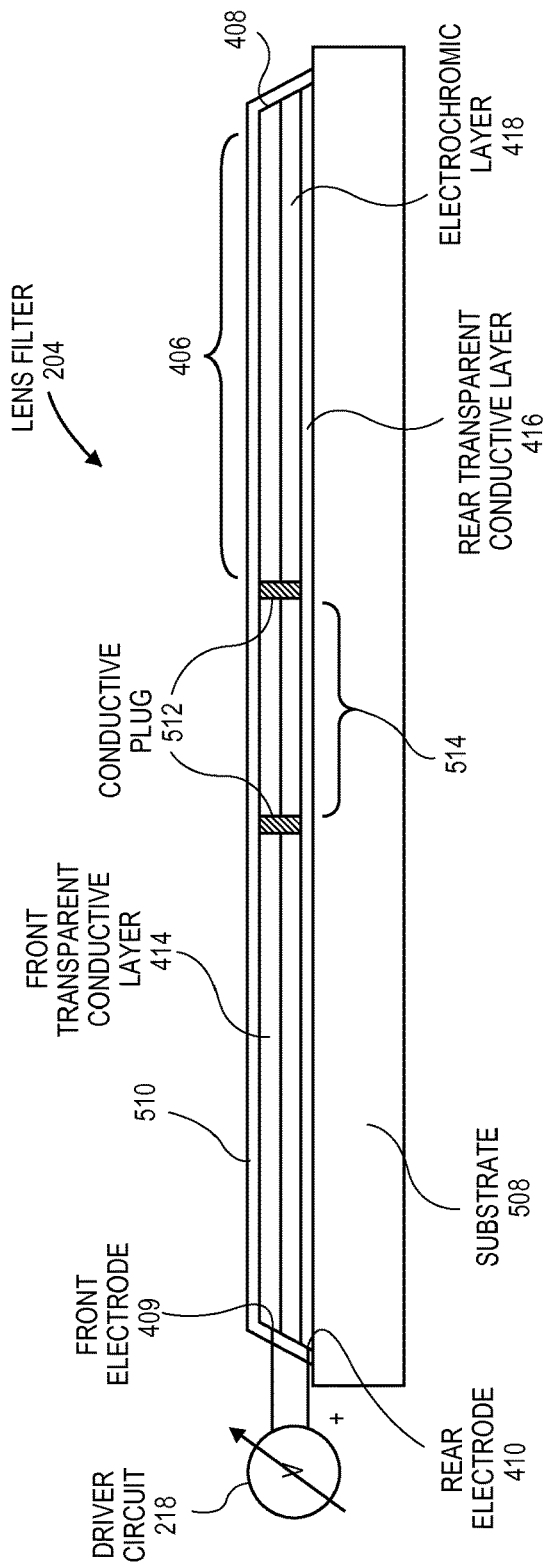
FIG. 5 is a cross-sectional view of a lens filter having an electric field gradient with radial and circumferential symmetry in accordance with an embodiment.

Referring to FIG. 5, a cross-sectional view of a lens filter having an electric field gradient with radial and circumferential symmetry is shown in accordance with an embodiment. Lens filter 204 includes an electrochromic device having an electrochromic layer 418 between a front transparent conductive layer 414 and a rear transparent conductive layer 416. In an embodiment, the transparent conductive layers sandwich, e.g., contact either side of electrochromic layer 418. Driver circuit 218 may be in electrical connection with front transparent conductive layer 414 through one or more front electrodes 409, and similarly, driver circuit 218 may be in electrical connection with rear transparent conductive layer 416 through one or more rear electrodes 410. Although driver circuit 218 is shown as being connected to rear electrode 410 along an outer wall or edge of rear transparent conductive layer 416, this is for illustration purposes, and it is apparent from the description herein that rear electrode 410 may be on a front surface of rear transparent conductive layer 416 and exposed to contact with driver circuit 218 through a circumferential opening in an axial direction. Furthermore, although the electrodes are shown on only one side of lens filter 204 in the cross-sectional view of FIG. 5 taken through optical axis 206, there may be front electrodes 409 and rear electrodes 410 positioned circumferentially about outer rim 408, including at a location diametrically opposite from the electrodes shown in FIG. 5. These other electrode pairs may be electrically activated by electrical leads placed in series with the illustrated electrical leads of driver circuit 218, or may be electrically activated by additional electrical leads connected to driver circuit 218 or to another driver circuit (not shown). Thus, lens filter 204 may incorporate an electrochromic device that may be electrically activated by driver circuit 218.

Front and rear transparent conductive layers 414, 416 may include a transparent conductive material, such as indium tin oxide (ITO). Of course, other transparent conductive materials capable of being formed in a thin layer may be used. Although the front and rear transparent conductive layers 414, 416 may be electrically conductive, in an embodiment, the transparent conductive material includes a finite resistivity per sheet area, i.e., the transparent conductive layers do not provide a short path across outer region 406 from outer rim 408 to aperture region 402 near a conductive plug 512. For example, in a case in which the transparent conductive layers are formed from ITO having a uniform thickness of about 20 nm, resistivity of the transparent conductive layers may be on the order of 500 to 2,000 Ω/sq. For example, sheet resistance of the transparent conductive layers may be about 1,000 Ω/sq. Thus, when driver circuit applies voltage to electrodes, a potential difference may be created between front transparent conductive layer 414 and rear transparent conductive layer 416 across electrochromic layer 418.

In an embodiment, electrochromic layer 418 may have several sub-layers. For example, as described further below, electrochromic layer 418 may include an electrolyte medium that includes an ion source material layer, an ion conduction material layer, and an active electrochromic material layer. Other layers or layer terminology may be added or substituted for electrochromic layer 418 within the skill in the art. For example, the ion source material layer may alternatively be referred to as a counter electrode layer. Ion source material layer may store suitable ions, such as lithium ions, that activate the active electrochromic material layer when a sufficient electric field is generated by driver circuit 218. In an embodiment, ion source material layer is optically transparent to allow light rays from a scene being imaged to transmit through the layer. Ion conduction material layer may allow for high mobility of ions that have been produced by the ion source material layer. More particularly, ion conduction material layer may facilitate transfer of the ions from the ion source material layer into the active electrochromic material layer. The ion conduction material layer may be optically transparent to allow light rays from a scene being imaged to transmit through the layer. In a deactivated state, the active electrochromic material layer may be transparent, but when ions transfer into the active electrochromic material layer, darkening of the active electrochromic material layer, and consequently lens filter 204, occurs. The darkening of lens filter 204 may occur over the area that an electric field gradient exists, e.g., over outer region 406, and may be proportional to the electrical potential across the electrochromic layer 418 within that area.

The electrochromic device of lens filter 204, which includes the transparent conductive layers 414, 416 and the electrochromic layer 418, may be supported on a substrate 508. For example, rear transparent conductive layer 416 may be formed or coupled with substrate 508. Front transparent conductive layer 414 may or may not appose a respective substrate 508. For example, in an embodiment, both front and rear transparent conductive layers 414, 416 may be formed on or coupled with respective substrates and then brought together to sandwich electrochromic layer 418. Substrate 508 may be formed from a transparent material, such as glass, polycarbonate, or another material or composition suitable for use in an optical system of portable consumer electronics device 100. More particularly, in an embodiment, substrate 508 transmits some portion of the visible wavelength range and is sufficiently rigid to support the electrochromic device of lens filter 204.

Optionally, lens filter 204 may include an optical material 510 over at least a portion of one or more of the stack layers. For example, in an embodiment, optical material 510 is an anti-reflection layer formed over front transparent conductive layer 414. Accordingly, the optical material 510 may be formed with one or more layers that reduce reflections through known techniques, e.g., index-matching, interference, etc. Alternatively, optical material 510 may be an infrared cut-off layer that includes a suitable material to block transmission of infrared light. Optical material 510 may be formed over only a portion of an adjacent transparent conductive layer, or may be patterned, e.g., etched, after forming a uniform layer to selectively expose underlying areas, such as electrodes on the underlying transparent conductive layers.

In an embodiment, lens filter 204 includes one or more conductive plug 512 between front transparent conductive layer 414 and rear transparent conductive layer 416. More particularly, conductive plug 512 may directly connect to front transparent conductive layer 414 at a first end and connect to rear transparent conductive layer 416 at a second end to directly connect one transparent conductive layer with another. As described further below, conductive plug 512 may include a variety of forms. For example, conductive plug 512 may be single annular element that fills a continuous trench formed through at least front transparent conductive layer 414 and electrochromic layer 418 to place the transparent conductive layers in electrical connection. Alternatively, in an embodiment, a plurality of variously sized and shaped conductive plugs 512 may be arranged around a center region 514, e.g., in a circumferential pattern, to create several discrete connections between the transparent conductive layers along the circumferential pattern. In any case, the one or more conductive plugs 512 may be arranged to create a continuous short path surrounding center region 514 of lens filter 204, e.g., center region 514 of rear transparent conductive layer 416 or any other lens filter 204 layer. In an embodiment, center region 514 is not electrically shorted. Thus, a radial electrical path extends from front electrode 409 through front transparent conductive layer 414, into and across one or more conductive plugs 512 to rear transparent conductive layer 416, and then through rear transparent conductive layer 416 to rear electrode 410. In an embodiment, no two points of the electrical path intersect, since electrochromic layer 418 may be disposed between the transparent conductive layers. Furthermore, electrical paths between electrode pairs that are diametrically opposite from one another may be separated by a gap or filler between respective conductive plugs on opposite sides of center region 514. For example, any or all of front transparent conductive layer 414, electrochromic layer 418, or rear transparent conductive layer 416 may be omitted or removed, e.g., by forming a hole, within center region 514. Accordingly, a radially symmetric electric field may be established in lens filter 204.

Figure 6:
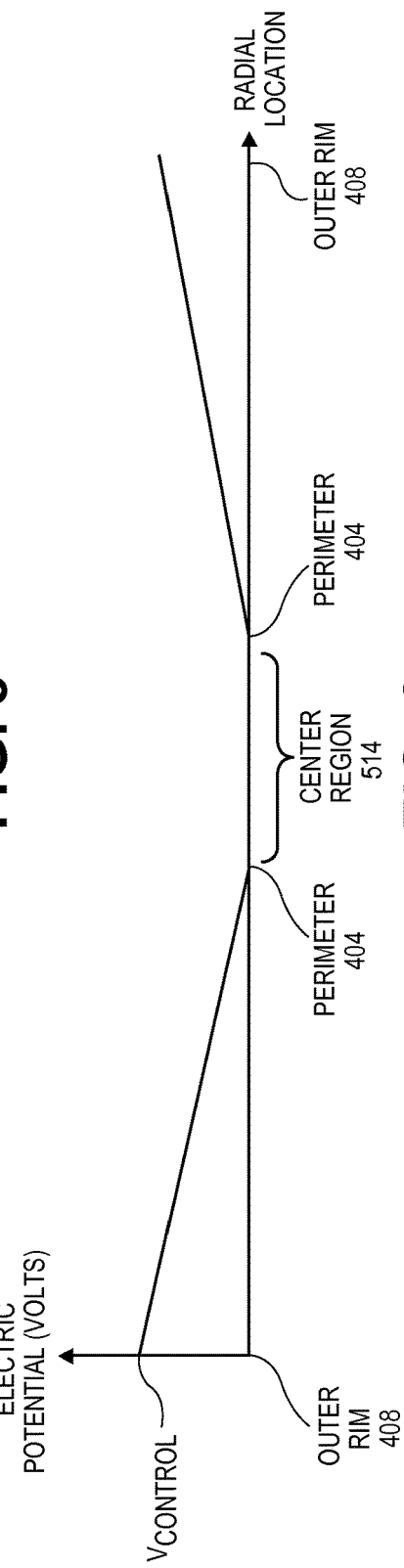
FIG. 6 is a graph showing a radially symmetric electric field gradient of a lens filter in accordance with an embodiment.

Referring to FIG. 6, a graph showing a radially symmetric electric field gradient of a lens filter is shown in accordance with an embodiment. In an embodiment, conductive plug 512 may be formed from a conductive material that is electrically conductive. For example, conductive plug 512 may be formed from indium, and thus, have an electrical resistivity of essentially zero. Zero resistivity may be, but is not required to be, no resistivity. For example, indium may have a resistivity of about 80 nΩ·m, which may be considered to be essentially zero within the context of this description. Accordingly, conductive plug 512 may cause an electrical short between the locations at which it contacts front transparent conductive layer 414 and rear transparent conductive layer 416. Given that front transparent conductive layer 414 and rear transparent conductive layer 416 may have non-zero resistivity, i.e., a finite resistivity per sheet area as described above, an electric field gradient may be formed across lens filter 204 when a voltage $V_{control}$, e.g., an excitation voltage of about one volt, is applied by driver circuit 218 between front electrode 409 and rear electrode 410.

The electric field gradient is apparent through the observation of electrical potential differences across electrochromic layer 418 plotted as a function of radial location on lens filter 204. Electrical potential difference across electrochromic layer 418 at a point on perimeter 404, which may also coincide with a location of conductive plug 512, is essentially zero, since conductive plug 512 creates an electrical short between the transparent conductive layers and thus the voltage level at the front transparent conductive layer 414 equals the voltage level at the rear transparent conductive layer 416. Conversely, electrical potential difference across electrochromic layer 418 may be at a maximum at a location where voltage is applied, e.g., at front electrode 409 and rear electrode 410 on outer rim 408. As shown, the electric field gradient may be radially symmetric. That is, the electric field may decrease from a maximum on diametrically opposite sides of outer rim 408 to a minimum at diametrically opposite sides of perimeter 404. The radially symmetric electric field gradient between outer rim 408 and perimeter 404 on either side of center region 514 of lens filter 204 is illustrated as being linear as a function of radial distance, which may correspond to a uniform thickness of constituent sub-layers of electrochromic layer 418 as shown in FIG. 5. However, in another embodiment, the gradient may be non-linear, and the non-linearity of the gradient may result from, e.g., an electrochromic layer 418 having a tapered active electrochromic material layer (not shown) or other material variations that cause resistivity of stack layers to vary differently in the radial direction from perimeter 404 toward outer rim 408.

Figure 7A:
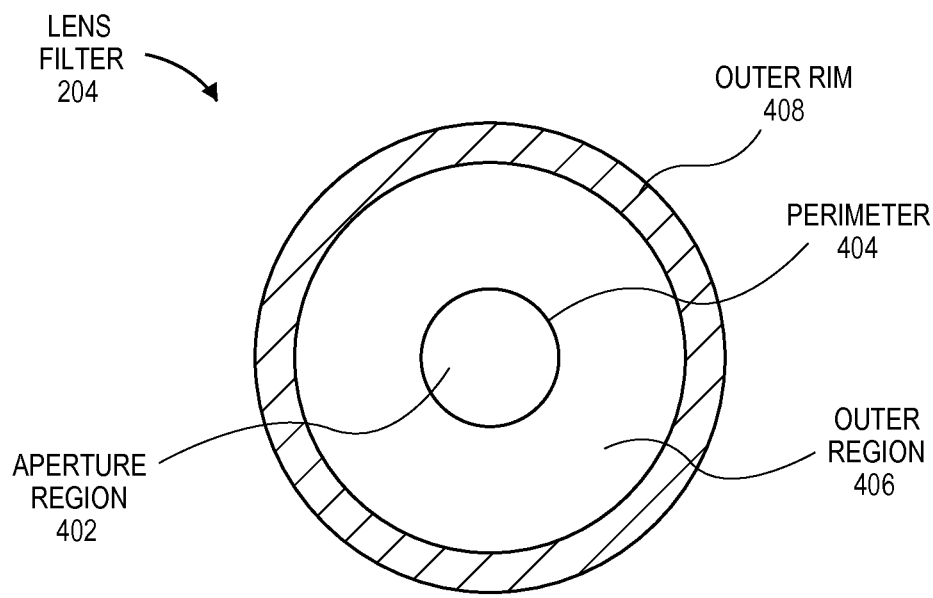
FIGS. 7A-7B are front views of a lens filter having an electric field gradient with radial and circumferential symmetry before and after electrical activation in accordance with an embodiment.

Referring to FIG. 7A, a front view of a lens filter that will display an electric field gradient with radial and circumferential symmetry upon electrical activation is shown, in accordance with an embodiment. In an embodiment, outer rim 408 may be darkened by, e.g., application of a protective coating over an outer periphery of lens filter 204 to make the outer rim 408 more robust and/or more suitable for clamping within a supportive barrel or frame of camera module 104. Furthermore, the darkened portion around outer rim 408 may extend into outer region 406, creating an inner edge to the darkened portion that may be circular and surround a lighter portion of outer region 406. Thus, the darkened portion may define a larger aperture size suitable for low light scenes when operating in a large aperture mode. Accordingly, the darkened portion may be an opaque optical material 510, e.g., a black coating, layered over a portion of front transparent conductive layer 414. Prior to electrical activation a "large" aperture size may be defined as including both aperture region 402 and at least a portion of outer region 406, i.e., the portion of outer region 406 not covered by the black coating. In the non-activated state, essentially no electrical potential difference may be applied across electrochromic layer 418, and thus, outer region 406 of the electro-optic portion of lens filter 204 may be transparent, like aperture region 402 within perimeter 404. In an embodiment, the black coating may extend over any portion of lens filter 204 that does not support a circumferentially uniform electric field. Thus, any portion of lens filter 204 that remains transparent in a large aperture mode may support a circumferentially uniform electric field in a small aperture mode.

Figure 7B:
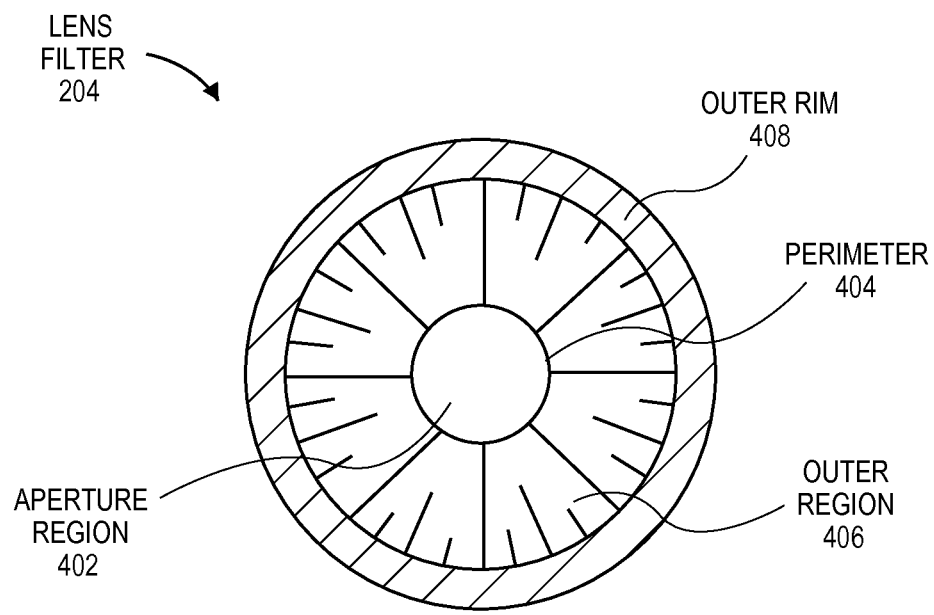

Referring to FIG. 7B, a front view of a lens filter having an electric field gradient with radial and circumferential symmetry after electrical activation is shown in accordance with an embodiment. Upon application of a control voltage to front electrode 409 and rear electrode 410 by driver circuit 218, an electric field gradient, such as the gradient shown in FIG. 6, is generated within electrochromic layer 418. More particularly, the electric field gradient decreases from a maximum electrical potential difference within electrochromic layer 418 near outer rim 408 to a minimum, e.g., essentially zero, at conductive plug 512 along perimeter 404 and within aperture region 402. Accordingly, the aperture size of lens filter 204 reduces as electrochromic layer 418 darkens in relation to its internal electric field gradient. Thus, electrochromic layer 418 darkens from a maximum opacity at outer rim 408 to a minimum opacity at perimeter 404. As the electric field gradient varies radially, so may the opacity profile vary radially. Therefore, a diameter of the aperture may be controlled by the profile, e.g., a diameter, of perimeter 404 along conductive plugs 512. As shown and described above, opacity may be circumferentially symmetric in relation to a circumferentially symmetric and/or uniform electric field in lens filter 204. In other embodiments, the electric field may be one of either radially symmetric or circumferentially symmetric, but need not be both. For example, three electrodes may be unevenly distributed around a circumference of the lens, with two electrodes diametrically opposite one another, to create a location with radial symmetry (through the diametrically opposing electrodes), but still provide a lens without a circumferentially symmetric electric field distribution (since an electric field distribution on one side of a plane extending through the diametrically opposing electrodes and the central axis may differ from an electric field on the other side).

Figure 8:
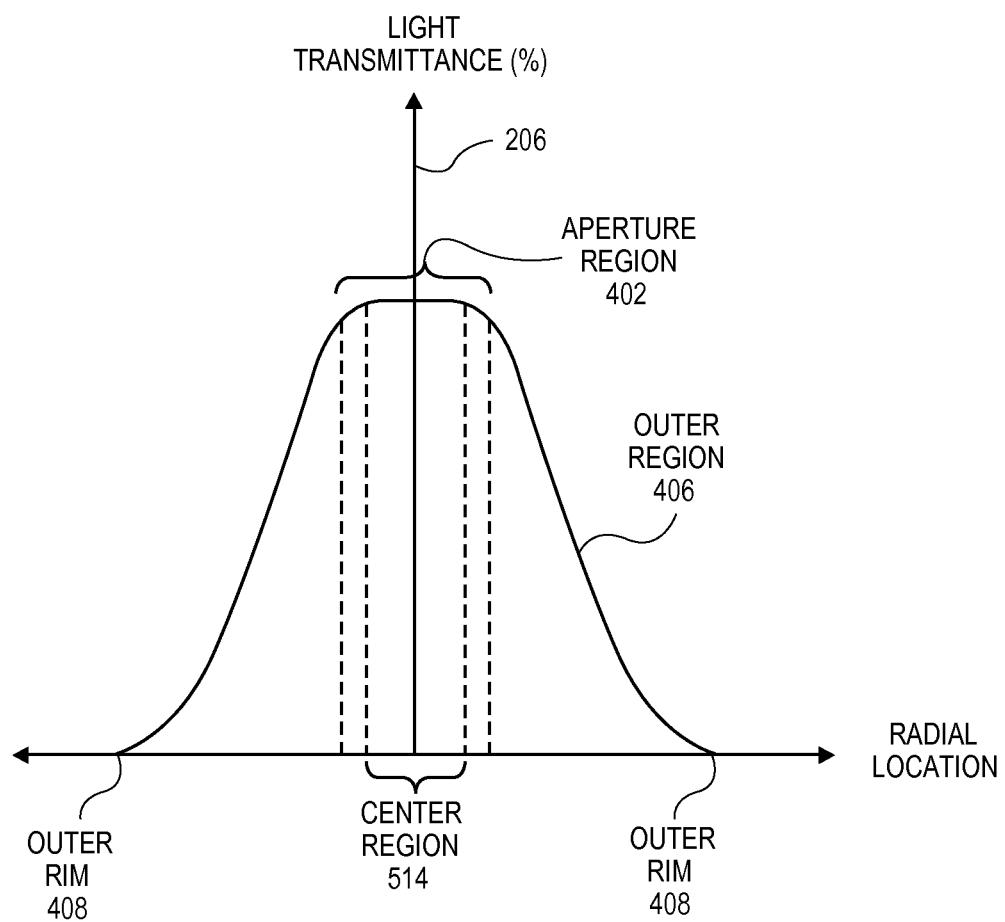
FIG. 8 is a graph showing a light transmittance profile for a lens filter in accordance with an embodiment.

Referring to FIG. 8, a graph showing a light transmittance profile for a lens filter is shown in accordance with an embodiment. Just as opacity of lens filter 204 may vary with radial location, so may the optical transmittance of visible light 208 through lens filter 204 vary from a minimum near outer rim 408, i.e., at the location of greatest opacity, to a maximum near center region 514 of lens filter 204, i.e., at the location of least opacity. It may be useful to note at this point that although aperture region 402 and center region 514 may correspond to the same region of lens filter 204, in an embodiment, they may not be identical areas. For example, aperture region 402 may refer more directly to an optical region at which light transmittance through lens filter 204 is nearly at a maximum, e.g., greater than about 95% of a maximum transmittance, while center region 514 may refer more directly to a physical location radially inward from the one or more conductive plugs 512. Thus, while light transmission may be high enough in both regions to form part of the stop aperture of camera module 104, they may not be identical. More particularly, electric field gradient of lens filter 204 may result in an apodized light transmittance profile (and a corresponding apodized light intensity profile on imaging sensor 200) as the transmitted light level tapers gradually from a maximum within center region 514 and aperture region 402 to a minimum at outer rim 408. That is, the light transmittance profile may taper or curve between the maximum and minimum across outer region 406 rather than exhibit a "top hat" light transmittance profile with a sharp drop-off at the aperture region edge.

Figure 9:
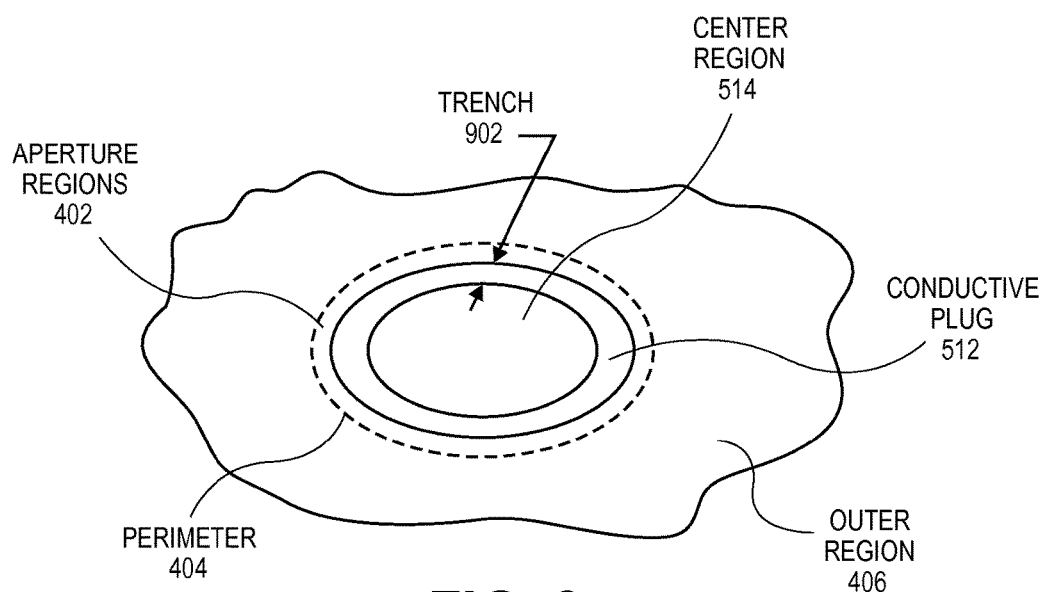
FIG. 9 is a partial perspective view of an aperture region of a lens filter having a continuous conductive plug around a transparent center region in accordance with an embodiment.

Referring to FIG. 9, a partial perspective view of an aperture region of a lens filter having a circular conductive plug around a transparent center region is shown in accordance with an embodiment. In an embodiment, conductive plug 512 includes a single annular plug through front transparent conductive layer 414 and electrochromic layer 418. For example, the annular plug may continuous or ring-like structure. In an embodiment, conductive plug 512 may include indium, or another conductive material, that is deposited, injected, flowed, or otherwise inserted into a space to create a direct connection between rear transparent conductive layer 416 at a bottom end, and front transparent conductive layer 414 at a top end. Thus, conductive plug 512 may form a continuous electrical short around center region 514. In the case where conductive plug 512 has an annular profile, the continuous electrical short may be circular.

Although conductive plug 512 may be annular, e.g., a circular tube, other embodiments may provide for a different aperture shape. For example, whereas aperture region 402 may have perimeter 404 that is essentially circular and slightly larger than an outer diameter of annular conductive plug 512, in an alternative embodiment, trench 902 may include any closed shape such as an elliptical, curvilinear, or polygonal, e.g., octagonal, square, star-shaped, cross-sectional profile, shape. Accordingly, the aperture region 402 within perimeter 404 may include a shape corresponding to that of the continuous short formed by conductive plug 512. That is, aperture region 402 may be defined by the creation of an electrical short, not at the center of aperture region 402, but rather, along the perimeter 404 of aperture region 402 around center region 514.

Notably, the transparent conductive layers may not be shorted to one another within center region 514, but the electric field of a material that fills center region 514 may nonetheless be negligible and/or zero, given that voltage is applied at the periphery of lens filter 204 and any electrical potential difference is shorted by conductive plug 512 outside of center region 514. As there is no voltage and/or electrical potential difference within center region 514 radially inward of conductive plug 512, the material in the area from optical axis 206 to the edge of center region 514 at conductive plug 512 appears transparent. Center region 514 having no electric field may be sized to achieve a desired light transmittance when lens filter 204 is placed in a small aperture mode, as illustrated in FIG. 8. Thus, a profile or diameter of center region 514 may vary according to design requirements. However, in an embodiment, center region 514 around which an electrical short is formed is at least about 2 mm in diameter. For example, center region 514 may have a width or diameter of between about 3-20 mm, e.g., 5 mm, at a location.

Figure 10:
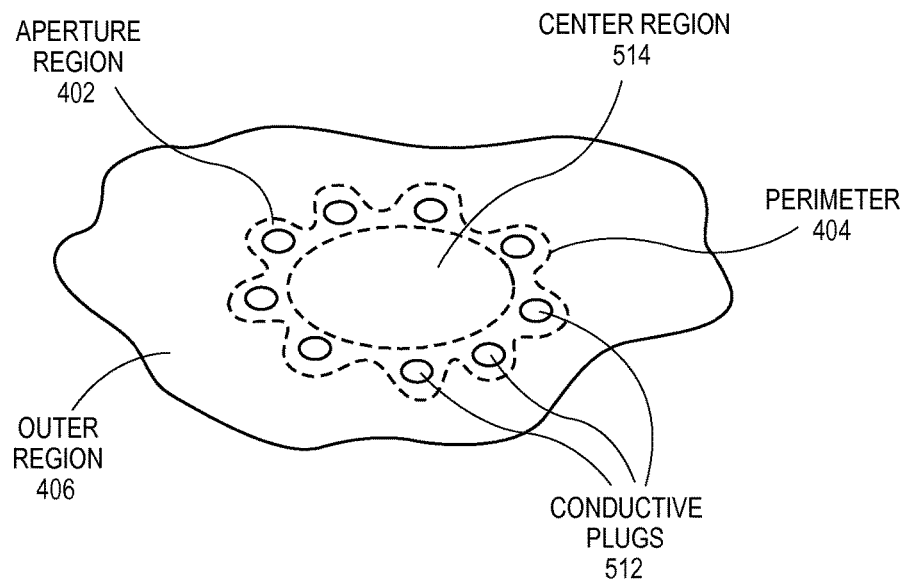
FIG. 10 is a partial perspective view of an aperture region of a lens filter having a plurality of conductive plug vias arranged circumferentially around a transparent center region in accordance with an embodiment.

Referring to FIG. 10, a partial perspective view of a center region of a lens filter having a plurality of conductive plug vias arranged circumferentially around a transparent center region is shown in accordance with an embodiment. In an alternative embodiment, rather than having a continuous conductive plug 512 formed around center region 514, lens filter 204 may include a plurality of conductive plugs 512, e.g., cylindrical conductive plugs, arranged in a pattern around center region 514. The plurality of conductive plugs 512 may have various cross-sectional shapes, e.g., circular in the case of cylindrical plugs or polygonal in the case of rectangular plugs. The plurality of conductive plugs 512 may also be arranged in a variety of pattern shapes, including polygonal. Furthermore, although the plurality of conductive plugs 512 may each have a solid cross-section, as in the case of a deposited conductive plug 512, one or more of the plurality of conductive plugs 512 may also have a non-solid cross-section, e.g., annular, as in the case of some types of electronic vias, e.g., tubular vias. Accordingly, in an embodiment, one or more of the plurality of conductive plugs 512 may be electronic vias, as are known in the art to be inexpensive and easy to manufacture.

As described above, conductive plug 512 may be continuous or discontinuous. For example, conductive plug 512 may be an annular conductor or several discrete conductors arranged to create a continuous electrical short. In an alternative embodiment, conductive plug 512 may be a single conductor, e.g., a c-shaped conductor with a cross-sectional profile that is substantially annular such that the ends of the c-shape terminate close to one another. Thus, although the ends are discontinuous, they may be close enough to each other to electrically short an electric field in lens filter 204 and prevent the electric field from creeping into center region 514. Thus, regardless of the specific structure of conductive plug 512, the electrical short created between transparent conductive layers 414, 416 by conductive plug(s) 512 may be continuous around and/or outside of center region 514.

Still referring to FIG. 10, since the electrical shorts provided by the plurality of conductive plugs 512 may be separated from each other across and around center region 514, the local electric field, as well as the shape of perimeter 404 of aperture region 402, may not be circular or have the same shape as a geometric chord passing through the conductive plugs 512. For example, the space between conductive plugs 512 may support some electrical potential difference across electrochromic layer 418, and accordingly, the opacity of lens filter 204 and the perimeter 404 of aperture region 402 may creep into the intervening space between conductive plugs 512. Nonetheless, the opacity of lens filter 204 may increase radially from perimeter 404 to outer rim 408 across outer region 406, similar to the other embodiments described above. Furthermore, the continuous short around center region 514 formed by conductive plug(s) 512 may maintain a transparent stop aperture.

Figure 11A:
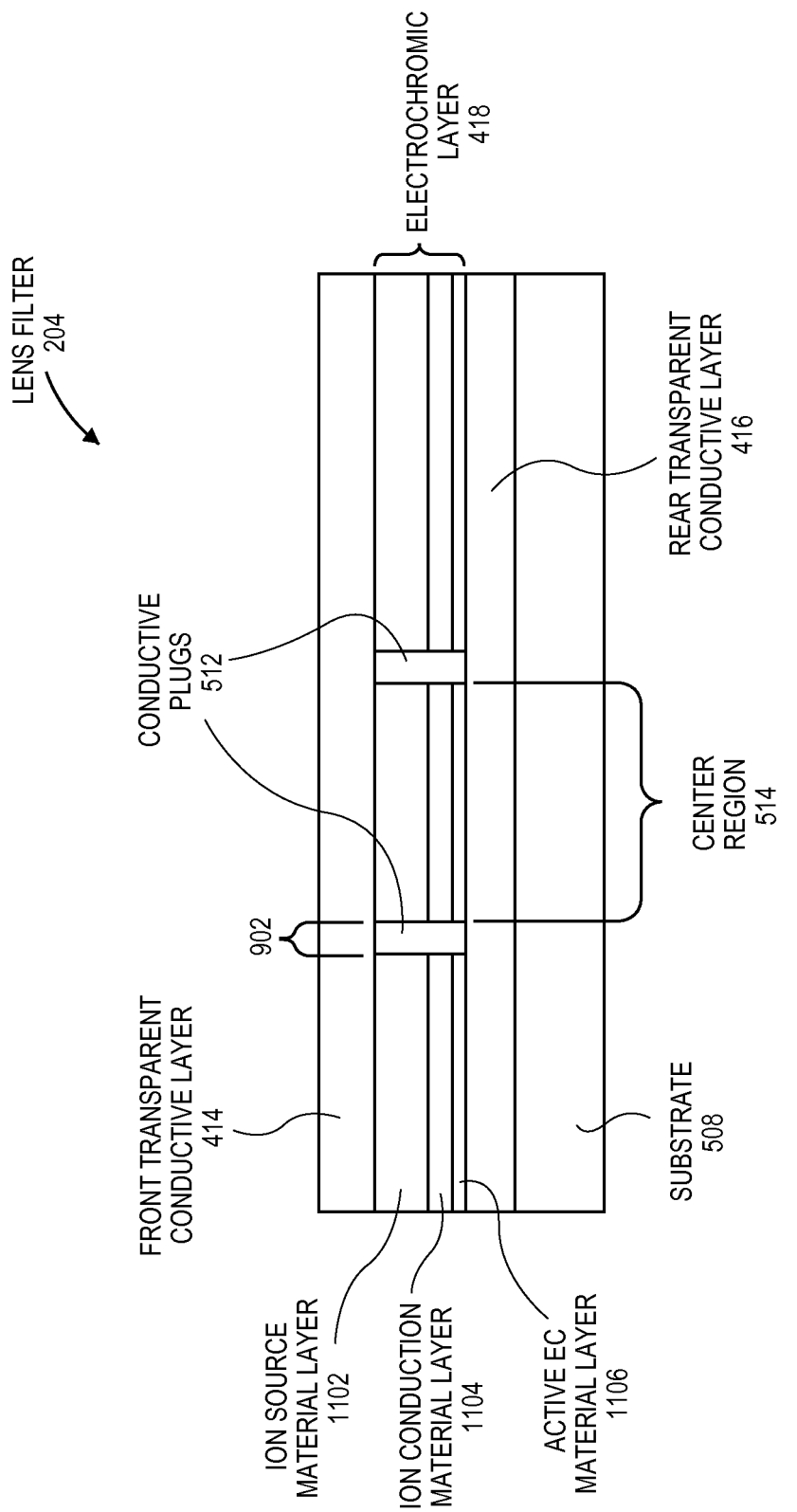
FIGS. 11A-11C are cross-sectional views, taken about line A-A of FIG. 4, showing an aperture region of a lens filter in accordance with several embodiments.

Referring to FIG. 11A, a cross-sectional view, taken about line A-A of FIG. 4, showing an aperture region of a lens filter is shown in accordance with an embodiment. In an embodiment, line A-A of FIG. 4 passes through one or more conductive plug 512 between the transparent conductive layers 414, 416. For example, the conductive plug 512 sections shown may be diametrically opposite portions of a continuous annular conductive plug 512 on either side of center region 514, as shown in FIG. 9. In an embodiment, conductive plug 512 includes a single annular plug filling a trench 902 formed axially through front transparent conductive layer 414 and electrochromic layer 418. For example, trench 902 may be laser-inscribed through front transparent conductive layer 414 and electrochromic layer 418. In an embodiment, the laser-inscription may pass into rear transparent conductive layer 416 also. The conductive filler making up conductive plug 512 may be pre-formed, e.g., an indium pin, and inserted into machined holes, or alternatively, the conductive filler making up conductive plug 512 may be a conductive material, e.g., indium, capable of being coated, deposited, injected, or otherwise flowed into the holes to form conductive plug 512. For example, after forming the trench, indium may be deposited into trench 902 to form the continuous conductive plug 512. The conductive plug 512 may contact both rear transparent conductive layer 416 at a bottom end, and front transparent conductive layer 414 at a top end, thus forming a continuous electrical short around center region 514. In the case where conductive plug 512 has an annular profile, the continuous electrical short may be circular.

Other manners of manufacturing lens filter 204 with a continuous conductive plug 512 may be used. For example, in an embodiment, rear transparent conductive layer 416 and electrochromic layer 418 may be formed over substrate 508, and then trench 902 may be etched, laser cut, or otherwise formed by removing material from electrochromic layer 418, up to rear transparent conductive layer 416. Conductive plug 512 may be deposited or inserted into trench 902, and subsequently, front transparent conductive layer 414 may be layered over electrochromic layer 418 having one or more sub-layers, e.g., ion source material layer 1102, ion conduction material layer 1104, or active electrochromic material layer 1106 to form an electrical connection with conductive plug 512. Thus, conductive plug 512 may be fully encapsulated between the layers of the electrochromic device of lens filter 204, while still providing an electrical short path between the transparent conductive layers 414, 416.

Still referring to FIG. 11A, the conductive plug 512 sections shown may be cross-sectional views of different discrete conductive plugs 512 arranged discontinuously around center region 514. For example, each rectangular cross section may be a cross-sectional view of a cylindrical conductive plug 512 (as described with respect to FIG. 10) inserted through electrochromic layer 418 to directly connect front transparent conductive layer 414 with rear transparent conductive layer 416. In another embodiment, conductive plugs 512 may have solid profiles that are arc-like, or have a shape that follows perimeter 404. For example, where perimeter 404 is circular, several distinct conductive plugs 512 having arc shapes that conform to the circle may be arranged along perimeter 404 to create a continuous electric short between transparent conductive layers 414, 416. Discrete conductive plugs 512 may be disposed within lens filter 204 in several manners. For example, a plurality of circular bores may be formed through electrochromic layer 418 and/or front transparent conductive layer 414 up to rear transparent conductive layer 416. Circular conductive plugs 512 may be deposited or inserted into the bores to form several discrete electrical shorts between the transparent conductive layers around center region 514. Similar deposition or insertion methodologies may be used to insert discrete plugs with different shapes and/or volumes.

Still referring to FIG. 11A, center region 514 may be filled by a material with non-zero resistivity. For example, center region 514 within conductive plug 512 may incorporate electrochromic layer 418 having non-zero resistivity. Alternatively, center region 514 may be filled with a different material having non-zero resistivity. For example, center region 514 within conductive plug(s) 512 may be filled with a transparent insulator, such as glass or polycarbonate. Thus, center region 514 may be filled with any material that does not create a short between front transparent conductive layer 414 and rear transparent conductive layer 416.

Figure 11B:
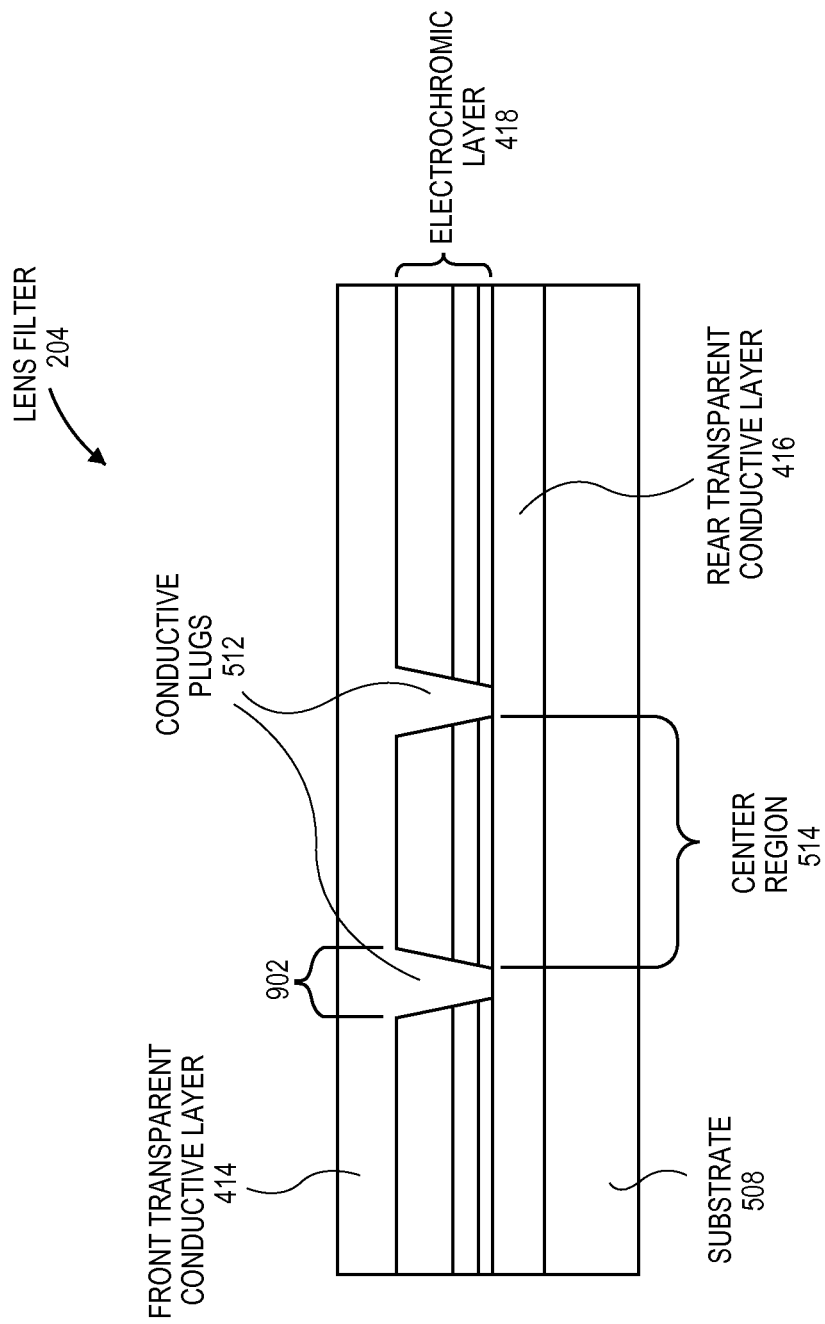

Referring to FIG. 11B, a cross-sectional view, taken about line A-A of FIG. 4, showing an aperture region of a lens filter is shown in accordance with an embodiment. In an embodiment, a continuous trench 902 may be formed through electrochromic layer 418 to rear transparent conductive layer 416 over substrate 508. The continuous trench 902 may be circular, and may surround center region 514. Furthermore, electrochromic layer 418 may remain intact radially inward from the trench 902. Subsequently, front transparent conductive layer 414 may be coated, deposited, or otherwise disposed over electrochromic layer 418. A portion of front transparent conductive layer 414 material may flow into and fill trench 902 during the layering of front transparent conductive layer 414. Accordingly, an electrochromic device having conductive plug 512 formed contiguously with, and from the same material as, front transparent conductive layer 414 may be formed.

Although conductive plug 512 may be contiguous with front transparent conductive layer 414, there may not be an electrical short across the material that fills center region 514, since conductive filler within trench 902, which makes up conductive plug 512, may have lower resistivity than the filler material within center region 514, e.g., electrochromic layer 418. Accordingly, any voltage may short across conductive plug 512 rather than the filler within center region 514. That is, given that such filler material would be radially inward from conductive plug 512, which forms an electrical short between transparent conductive layers, the filler material may not support an electric field, and thus, may remain transparent in a small aperture mode.

Figure 11C:
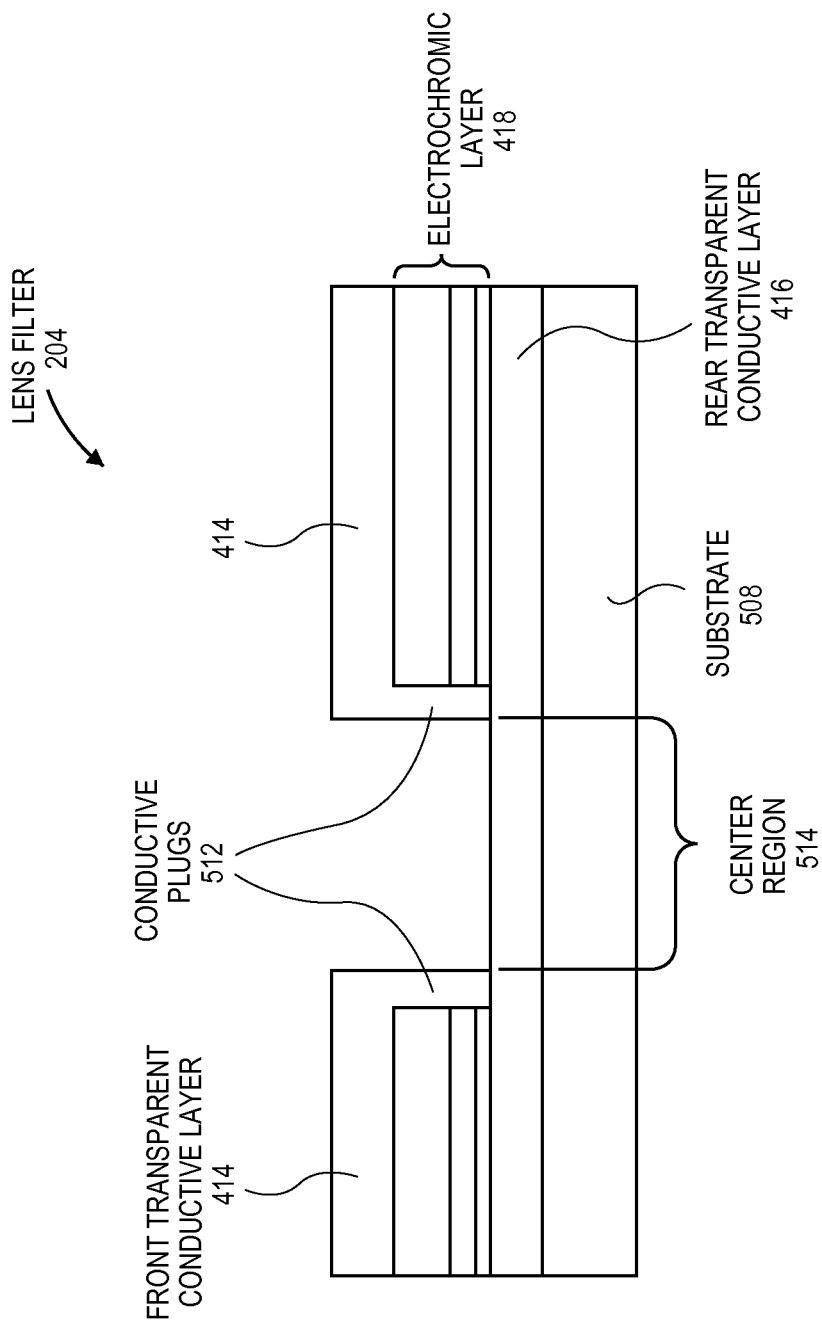

Referring to FIG. 11C, a cross-sectional view, taken about line A-A of FIG. 4, of an aperture region of a lens filter is shown in accordance with an embodiment. In an alternative embodiment, lens filter 204 may have all or some of front transparent conductive layer 414 and electrochromic layer 418 removed over center region 514 of rear transparent conductive layer 416. For example, after forming rear transparent conductive layer 416 and electrochromic layer 418 over substrate 508, a hole may be formed through electrochromic layer 418 to remove electrochromic layer material over center region 514 of rear transparent conductive layer 416 and create a counterbore with a bottom terminating at rear transparent conductive layer 416 or substrate 508. Removal may be achieved by etching or micromachining, for example. Subsequently, front transparent conductive layer 414 may be deposited over electrochromic layer 418. In an embodiment, front transparent conductive layer 414 may entirely fill the void formed over rear transparent conductive layer 416. As described above, center region 514 of lens filter 204 may nonetheless remain transparent since any electric field may be shorted electrically outward at conductive plug(s) 512. Alternatively, as shown in FIG. 11C, at least some portion of the void may be left intact, either by removing front transparent conductive layer 414 material over center region 514, or by only depositing front transparent conductive layer 414 up to the center region 514, as depicted. Accordingly, at least some amount of front transparent conductive layer 414 extends beyond electrochromic layer 418 and is layered over a sidewall of electrochromic layer 418 to make contact with rear transparent conductive layer 416. Thus, in an embodiment, front transparent conductive layer 414 material may form conductive plug 512 along the sidewall of electrochromic layer 418. More particularly, front transparent conductive layer 414 and conductive plug 512 may be contiguously formed from a same conductive material.

It will be appreciated therefore that conductive plug 512 need not have an electrical resistivity of substantially zero. For example, since conductive plug 512 may be formed from the same material as front transparent conductive layer 414, e.g., ITO, conductive plug 512 may include a resistivity similar to that of front transparent conductive layer 414. More particularly, conductive plug 512 may be formed from a material with a resistivity higher than indium, and the electrical path between front transparent conductive layer 414 and rear transparent conductive layer 416 may include some voltage drop. Nonetheless, given that the distance between front transparent conductive layer 414 and rear transparent conductive layer 416 may be much less than the radius of lens filter 204, any voltage drop may be negligible, i.e., the transparent conductive layers may have substantially equal voltages across conductive plug 512 even if conductive plug 512 does not create an electrical short between the layers.

Figure 12A:
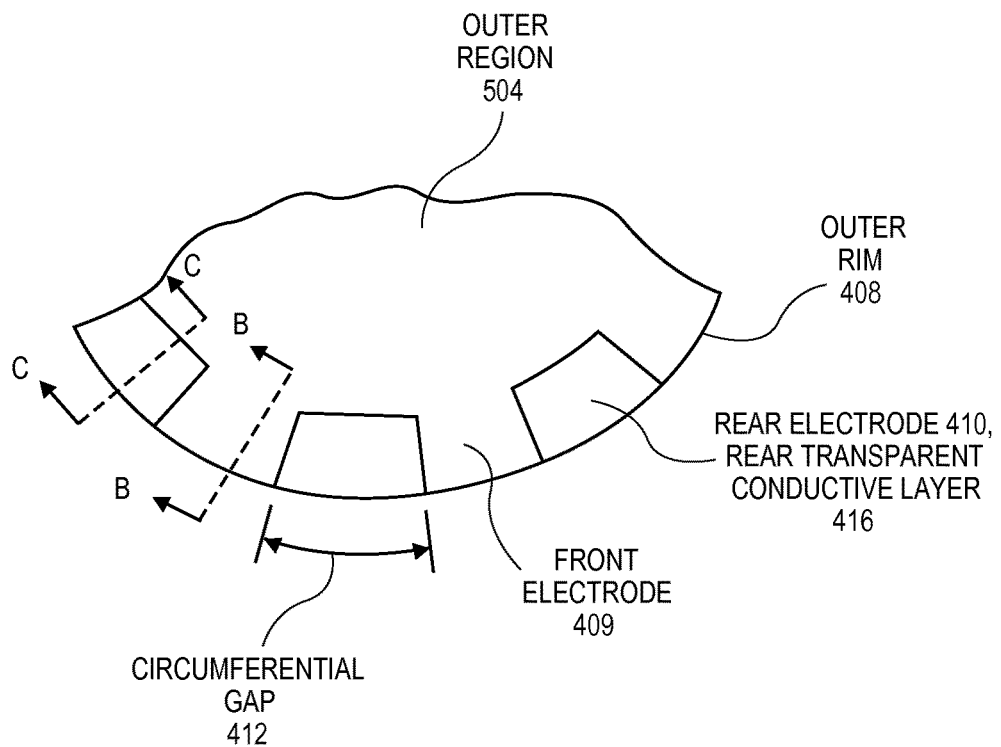
FIGS. 12A-12B are partial front views of a plurality of segmented electrodes arranged along an outer rim of a lens filter in accordance with several embodiments.

Referring to FIG. 12A, a partial front view of a plurality of segmented electrodes arranged along an outer rim of a lens filter is shown in accordance with an embodiment. As described above with respect to FIG. 4, a plurality of electrodes may be distributed around outer rim 408 to provide symmetric and/or uniform distribution of electric field in a circumferential direction. That is, since the electrodes may be equally spaced around outer rim 408, application of a same voltage to each electrode may produce a circumferentially symmetric voltage distribution. Although the distribution may vary between peaks at the electrodes and minima circumferentially half-way between the electrodes near outer rim 408, at a location radially inward of outer rim 408, the distribution may be uniform, i.e., without maxima and minima in the circumferential direction. The degree of circumferential variation and the radial location at which the even distribution of electric field becomes uniform may depend on a circumferential distance between electrodes, given that the variation is due to voltage drops through the transparent conductive layer materials. Thus, the circumferential distance between electrodes may be minimized to increase the number of electrode contacts and the circumferential symmetry/uniformity of the electric field within lens filter 204.

As shown, circumferential gap 412 may have a substantially rectangular, or trapezoidal, shape. Alternatively, circumferential gap 412 may have any other shape that is sized to permit access by an electrical lead in an axial direction to contact an exposed rear electrode 410. In an embodiment, circumferential gap 412 extends from outer rim 408 to within outer region 406 of front transparent conductive layer 414. Thus, in an embodiment, circumferential gap 412 may be formed by machining, e.g., micromachining, lens filter 204 to remove front transparent conductive layer 414 and electrochromic layer 418 overlying rear transparent conductive layer 416.

In an alternative embodiment, the segmented structure of lens filter 204 electrodes may include one or more electrodes that extend radially from a central hub. For example, rather than circumferential gaps 412 being formed by the removal of material from front transparent conductive layer 414, each front electrode 409 may be a separate component, e.g., a thin electrode tab adjoined to front transparent conductive layer 414 along the conductive layer outer periphery. Similarly, rear electrodes 410 may include one or more segmented electrode tabs adjoined to rear transparent conductive layer 416 along the conductive layer outer periphery. Thus, since the electrodes may extend from an electrochromic stack of lens filter 204, circumferential gaps 412 may not be formed by removal of lens filter 204 material during fabrication, but rather, circumferential gaps 412 may be defined between extensions that are added to lens filter 204 during fabrication.

Figure 12B:
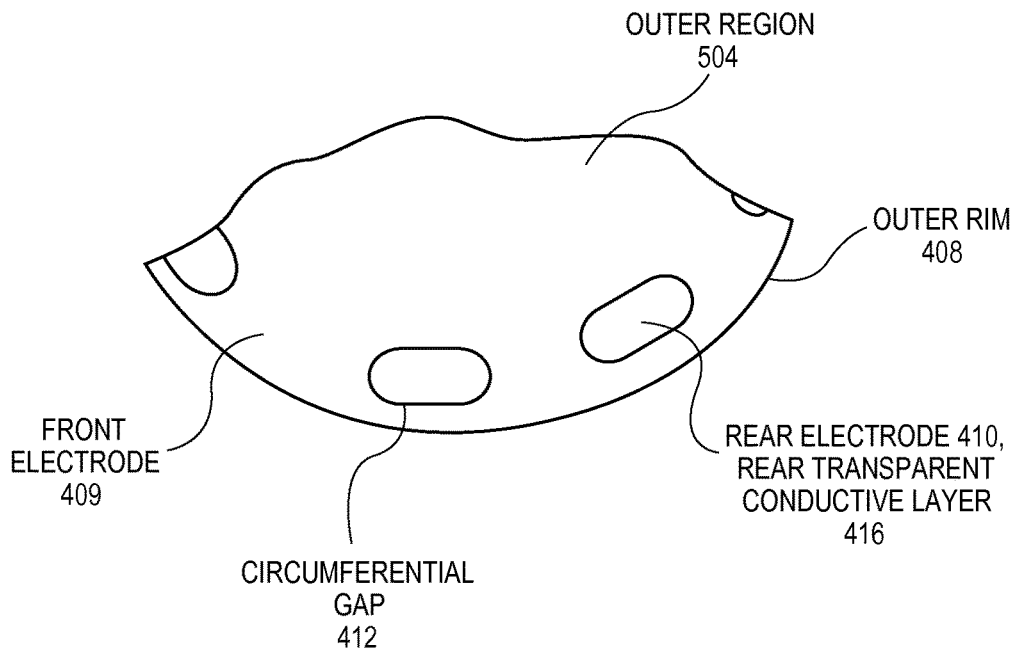

Referring to FIG. 12B, a partial front view of a plurality of segmented electrodes arranged along an outer rim of a lens filter is shown in accordance with an embodiment. Circumferential gap 412 may not extend from outer rim 408, but rather, may be a void of any shape and size large enough to permit axial access to rear electrode 410 through front transparent conductive layer 414. For example, all electrodes may be accessed from a front side of lens filter 204. Circumferential gap 412 may be formed by machining, e.g., micromachining, a circular, elliptical, rectangular, etc., profile through a previously layered front transparent conductive layer 414 and electrochromic layer 418. Accordingly, access to rear electrode 410 may be enabled with minimal removal of material to match a profile of a pin or other electrical contact that extends to contact rear electrode 410.

In an embodiment, front electrodes 409 and rear electrodes 410 arranged in a circular fashion may also be arranged about a same diameter. That is, a circle circumscribing front electrodes 409 may have a same diameter as a circle circumscribing rear electrodes 410. Alternatively, electrodes may be staggered, i.e., front electrode 409 and rear electrode 410 may be along respective profiles circumscribing different diameters. Furthermore, although front electrodes 409 and rear electrodes 410 have been primarily described as being circumferentially offset from one another, e.g., located along different radials of lens filter 204, in an embodiment, corresponding front electrodes 409 and rear electrodes 410 may be circumferentially aligned, i.e., along a same radial line emanating from optical axis 206. This may be the case where front electrode 409 on a radial is located at a first distance along a radial of lens filter 204 and rear electrode 410 is located on the same radial at a second distance along the radial greater than the first distance.

Figure 13:
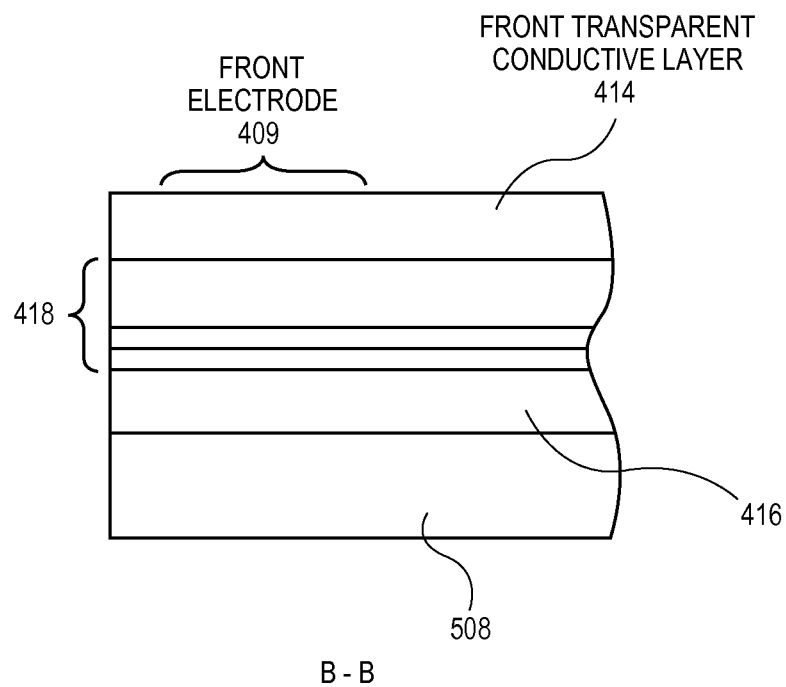
FIG. 13 is a cross-sectional view, taken about line B-B of FIG. 12A, of a front electrode of a lens filter in accordance with an embodiment.

Referring to FIG. 13, a cross-sectional view, taken about line B-B of FIG. 12A, of a front electrode of a lens filter is shown in accordance with an embodiment. Front electrode 409 may be a surface area on a front face of front transparent conductive layer 414 of the electrochromic device of lens filter 204. More particularly, front electrode 409 may be a region on the front face of front transparent conductive layer 414, rather than a separate component. Alternatively, front electrode 409 may include a separate component, such as a deposited contact pad, e.g., an indium pad. For example, in an embodiment, each front electrode 409 may include an electrode pad having a diameter of between about 2-10 mm, e.g., 5 mm, and a thickness between about 0.2-1.0 mm, e.g., 0.6 mm, deposited on front transparent conductive layer 414. As shown, a portion of lens filter 204 having front electrode 409 may include the entire stack of the electrochromic device, i.e., front transparent conductive layer 414, electrochromic layer 418, rear transparent conductive layer 416, and substrate 508. This structure may be the same for every front electrode 409 region along outer rim 408 of lens filter 204. Alternatively, front electrode 409 structures may differ, e.g., may have different pad materials or sizes around the circumference of lens filter 204.

Figure 14A:
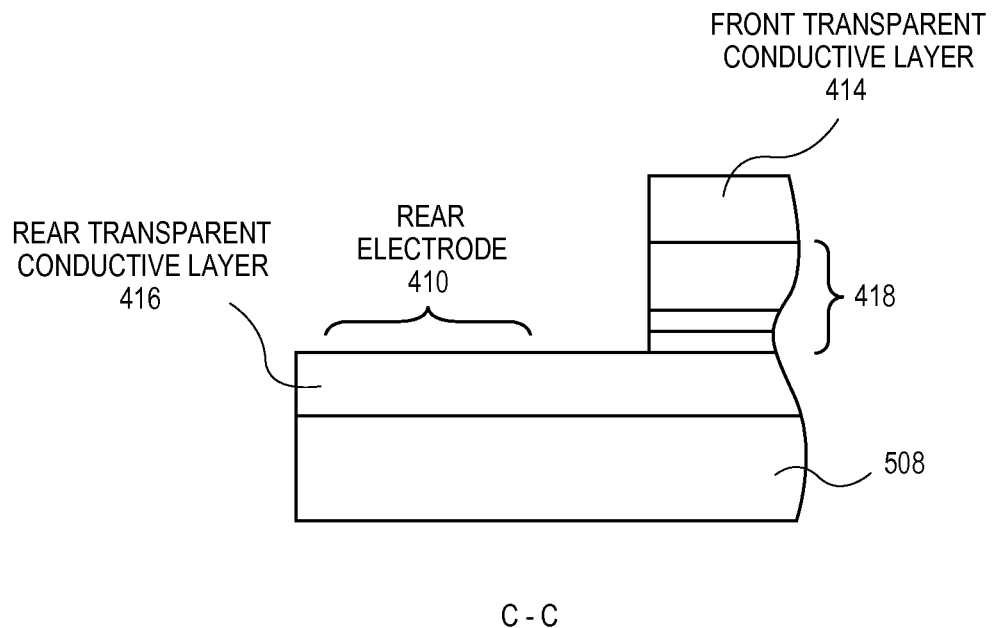
FIGS. 14A-14B are cross-sectional views, taken about line C-C of FIG. 12A, of a rear electrode of a lens filter in accordance with several embodiments.

Referring to FIG. 14A, a cross-sectional view, taken about line C-C of FIG. 12A, of a rear electrode of a lens filter is shown in accordance with an embodiment. In contrast to a front electrode 409 region of lens filter 204, a rear electrode 410 region may not include the entire stack of the electrochromic device. That is, electrochromic layer 418 and front transparent conductive layer 414 may be removed over rear transparent conductive layer 416 and substrate 508 to expose a rear electrode 410 surface area on a front face of rear transparent conductive layer 416. More particularly, rear electrode 410 may be a region on the front face of rear transparent conductive layer 416, rather than a separate component. The rear electrode 410 region may be large enough to permit contact with an external lead, such as an electrical pin or lead that reaches axially through circumferential gap 412 to contact rear electrode 410.

Figure 14B:
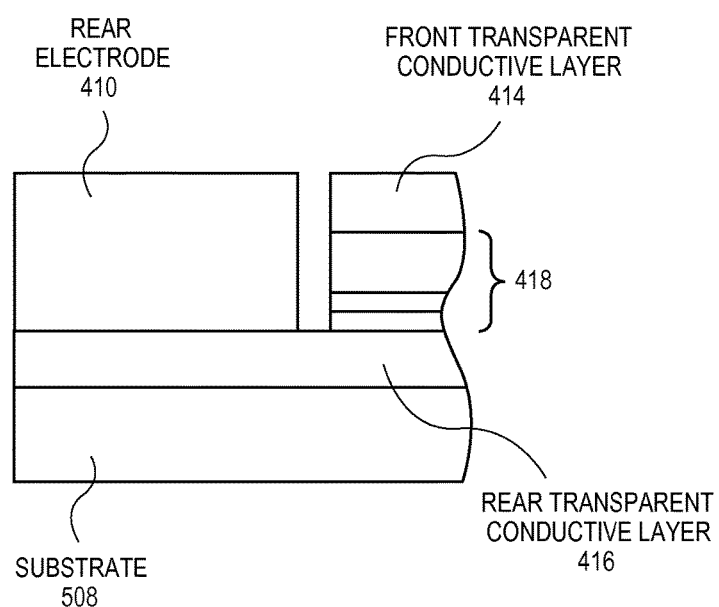

Referring to FIG. 14B, a cross-sectional view, taken about line C-C of FIG. 12A, of a rear electrode of a lens filter is shown in accordance with an embodiment. In an alternative embodiment, rear electrode 410 may be formed as a separate component over rear transparent conductive layer 416. For example, rear electrode 410 may be deposited as a pad with a height that is approximately the same as the combined thickness of front transparent conductive layer 414 and electrochromic layer 418. In an embodiment, each rear electrode 410 may include an electrode pad having a diameter of between about 2-10 mm, e.g., 5 mm, and a thickness between about 0.2-1.0 mm, e.g., 0.6 mm, deposited over rear transparent conductive layer 416. Thus, rear electrode 410 may have a front face that is substantially coplanar with a front face of front transparent conductive layer 414 and/or front electrode 409. Accordingly, external contacts such as leads or pins connected with driver circuit 218 may contact all electrodes of lens filter 204 at approximately the same axial location.

Other electrode configurations may be used to evenly distribute the electric field in a circumferential manner around outer rim 408. For example, rear electrodes 410 may be accessible along an edge of lens filter 204, e.g., at a region on an outer wall of rear transparent conductive layer 416. Alternatively, rear electrodes 410 may be on a rear face of rear transparent conductive layer 416, and thus, external leads or electrical contacts such as pins may access and contact rear electrodes 410 from behind lens filter 204. Therefore, the embodiments described above are not limiting of the range of possible configurations to create a lens filter 204 having a transparent center region 514 and an electrochromic portion that supports both a radially symmetric electric field gradient and a circumferentially symmetric and/or uniform electric field.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A lens filter, comprising:
   a front transparent conductive layer;
   a rear transparent conductive layer having an outer region surrounding a perimeter of a center region;
   an electrochromic layer between the front transparent conductive layer and the rear transparent conductive layer; and
   one or more conductive plugs arranged along the perimeter at a plurality of points around the center region, each conductive plug extending across the electrochromic layer to provide an electrical short path from the front transparent conductive layer to the rear transparent conductive layer, wherein the electrical short path surrounds the center region such that application of an electrical potential to the front and rear transparent conductive layers in the outer region generates a non-zero electrical potential difference across the electrochromic layer in the outer region and generates zero electrical potential difference across the electrochromic layer in the center region.

2. The lens filter of claim 1, wherein each conductive plug directly connects the front transparent conductive layer with the rear transparent conductive layer, and wherein each conductive plug creates an electrical short between the front transparent conductive layer and the rear transparent conductive layer.

3. The lens filter of claim 2, wherein a plurality of front electrodes along an outer rim of the front transparent conductive layer are separated from a plurality of rear electrodes along an outer rim of the rear transparent conductive layer such that application of the electrical potential to the front electrodes and the rear electrodes generates a radially symmetric electric field gradient in the electrochromic layer from a maximum electrical potential difference across the electrochromic layer at the outer rims to the zero electrical potential difference across the electrochromic layer at the perimeter.

4. The lens filter of claim 3, wherein the perimeter is circular.

5. The lens filter of claim 4, wherein the front transparent conductive layer and the electrochromic layer extend over the center region.

6. The lens filter of claim 5, wherein the electrochromic layer includes a trench along the perimeter, and wherein the one or more conductive plugs include a conductive filler in the trench.

7. The lens filter of claim 6, wherein the trench is a continuous trench along the entire perimeter.

8. The lens filter of claim 7, wherein the trench extends in an axial direction through the front transparent conductive layer and the electrochromic layer to the rear transparent conductive layer.

9. The lens filter of claim 4, wherein the center region is exposed in an axial direction through the front transparent conductive layer and the electrochromic layer.

10. The lens filter of claim 9, wherein the front transparent conductive layer and the one or more conductive plugs are contiguous.

11. The lens filter of claim 4, wherein the one or more conductive plugs include a set of electrical vias arranged along the perimeter.

12. A lens filter, comprising:
    a front transparent conductive layer having a plurality of front electrodes arranged along an outer rim of the front transparent conductive layer, wherein the plurality of front electrodes are separated along the outer rim by a plurality of circumferential gaps;
    a rear transparent conductive layer having an outer region surrounding a perimeter of a center region, wherein the rear transparent conductive layer has a plurality of rear electrodes arranged along an outer rim of the rear transparent conductive layer, and wherein the plurality of rear electrodes are exposed in an axial direction through the plurality of circumferential gaps;
    an electrochromic layer between the front transparent conductive layer and the rear transparent conductive layer; and
    one or more conductive plugs arranged along the perimeter at a plurality of points around the center region, each conductive plug directly connecting the front transparent conductive layer with the rear transparent conductive layer across the electrochromic layer to provide an electrical short path surrounding the center region such that application of an electrical potential to the front and rear electrodes in the outer region generates a non-zero potential difference across the electrochromic layer in the outer region and generates zero electrical potential difference across the electrochromic layer in the center region.

13. The lens filter of claim 12, wherein the plurality of front electrodes and the plurality of rear electrodes are distributed evenly along the respective outer rims and are arranged circumferentially about a same diameter.

14. The lens filter of claim 13, wherein the plurality of front electrodes includes at least four front electrodes.

15. The lens filter of claim 14, wherein the plurality of circumferential gaps include a plurality of holes extending in an axial direction through the front transparent conductive layer and the electrochromic layer to the rear transparent conductive layer.

16. A portable consumer electronics device, comprising:
a device housing; and
a camera module integrated in the device housing, the camera module having an imaging sensor configured to receive light from a scene through a lens filter, wherein the lens filter includes:
a front transparent conductive layer;
a rear transparent conductive layer having an outer region surrounding a perimeter of a center region;
an electrochromic layer between the front transparent conductive layer and the rear transparent conductive layer; and
one or more conductive plugs arranged along the perimeter at a plurality of points around the center region, each conductive plug extending across the electrochromic layer to provide an electrical short path from the front transparent conductive layer to the rear transparent conductive layer, wherein the electrical short path surrounds the center region such that application of an electrical potential to the front and rear transparent conductive layers in the outer region generates a non-zero electrical potential difference across the electrochromic layer in the outer region and generates zero electrical potential difference across the electrochromic layer in the center region.

17. The portable consumer electronics device of claim 16, wherein each conductive plug directly connects the front transparent conductive layer with the rear transparent conductive layer, and wherein each conductive plug creates an electrical short between the front transparent conductive layer and the rear transparent conductive layer.

18. The portable consumer electronics device of claim 17 further comprising:
a plurality of front electrodes arranged along an outer rim of the front transparent conductive layer;
a plurality of rear electrodes arranged along an outer rim of the rear transparent conductive layer; and
a driver circuit configured to apply the electrical potential to the front electrodes and the rear electrodes to generate a radially symmetric electric field gradient in the electrochromic layer that decreases from a maximum electrical potential difference across the electrochromic layer at the outer rims to zero electrical potential difference across the electrochromic layer at the perimeter.

19. The portable consumer electronics device of claim 18, wherein the front transparent conductive layer and the electrochromic layer extend over the center region.

20. The portable consumer electronics device of claim 18, wherein the center region is exposed in an axial direction through the front transparent conductive layer and the electrochromic layer.

* * * * *